(12) United States Patent
Zeng et al.

(10) Patent No.: US 8,058,973 B2
(45) Date of Patent: Nov. 15, 2011

(54) RADIO FREQUENCY IDENTIFICATION SYSTEM AND METHOD

(75) Inventors: Ke Zeng, Beijing (CN); Tomoyuki Fujita, Beijing (CN); Min-yu Hsueh, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 1433 days.

(21) Appl. No.: 11/519,130

(22) Filed: Sep. 12, 2006

(65) Prior Publication Data

US 2007/0057768 A1     Mar. 15, 2007

(30) Foreign Application Priority Data

Sep. 13, 2005 (CN) .......................... 2005 1 0102866
Sep. 20, 2005 (CN) .......................... 2005 1 0109693

(51) Int. Cl.
*H04Q 5/22* (2006.01)
*G08B 13/14* (2006.01)

(52) U.S. Cl. ................ 340/10.1; 340/10.4; 340/10.5; 340/572.1; 340/572.3

(58) Field of Classification Search ........ 340/10.1–10.5, 340/572.1, 572.3; 705/51, 75; 235/385, 235/383, 462.01; 713/171, 168; 455/411; 380/51

See application file for complete search history.

(56) References Cited

U.S. PATENT DOCUMENTS

| 5,469,363 | A | | 11/1995 | Saliga | |
|---|---|---|---|---|---|
| 6,025,780 | A | * | 2/2000 | Bowers et al. | 340/572.3 |
| 6,442,276 | B1 | * | 8/2002 | Doljack | 380/51 |
| 6,738,903 | B1 | * | 5/2004 | Haines | 713/168 |
| 6,933,848 | B1 | | 8/2005 | Stewart et al. | |
| 7,120,802 | B2 | * | 10/2006 | Shear et al. | 713/194 |
| 7,322,520 | B2 | * | 1/2008 | Warden et al. | 235/383 |
| 7,364,074 | B2 | * | 4/2008 | He et al. | 235/385 |
| 7,425,897 | B2 | * | 9/2008 | Fukushima et al. | 340/572.1 |
| 2005/0049979 | A1 | * | 3/2005 | Collins et al. | 705/75 |
| 2006/0123041 | A1 | * | 6/2006 | Sandrini et al. | 707/102 |

FOREIGN PATENT DOCUMENTS

| CN | 12255678 A | 6/2000 |
|---|---|---|
| CN | 1453728 A | 11/2003 |
| CN | 1523515 A | 8/2004 |
| CN | 1584911 A | 2/2005 |
| CN | 1588436 A | 3/2005 |
| CN | 1604114 A | 4/2005 |
| CN | 1773905 A | 5/2006 |
| JP | 2005-130059 A | 5/2005 |
| WO | WO 2005/024697 A2 | 3/2005 |

OTHER PUBLICATIONS

"Handbook of Applied Cryptography, by A. Menezes, P. van Oorschot, and S. Vanstone, CRC Press, 1996."

* cited by examiner

*Primary Examiner* — Nam V Nguyen
(74) *Attorney, Agent, or Firm* — Sughrue Mion, PLLC

(57) ABSTRACT

A radio frequency identification system, including: a radio frequency identification tag having an identification code and a set of verifiable data stored therein; and a radio frequency identification reader which sends a reading request to the radio frequency identification tag, requesting to read a first portion of the set of verifiable data, wherein the radio frequency identification tag further comprising control means, which, when the radio frequency identification tag receives the reading request from the radio frequency identification reader, in case of that the set of verifiable data has not been performed a locking operation, performs the locking operation on the set of verifiable data, so that from then on any data of a second portion of the set of verifiable data cannot be read.

12 Claims, 21 Drawing Sheets

RADIO FREQUENCY IDENTIFICATION SYSTEM AND METHOD

FIELD OF THE INVENTION

The present invention generally relates to computer systems, more particularly, to a radio frequency identification (RFID) system and a radio frequency identification method.

BACKGROUND OF THE INVENTION

Counterfeits are extremely severe trouble to product manufacturers. Today, counterfeits can be seen in many industries, e.g. wine, cigarette, drug, cosmetics, CD, DVD, software, sports appliance, children's article, jewelry, etc. For decades, the industries are combating with the forgers. However, along with the continuous march of anti-counterfeit effort, counterfeits are getting incredibly prevalent in most countries, no matter western or eastern.

Counterfeits bring to innocent manufacturers not only huge loss in terms of profit, but also disaster in terms of credit. An ordinary consumer, who unfortunately buys counterfeit and is dissatisfied with the poor quality of the counterfeit, in many cases cannot distinguish the counterfeit from genuine product, therefore will negatively however falsely assess the product quality of the genuine manufacturer. The final sad story is: the forger makes money while the innocent manufacturer gets punished.

The product manufacturers are always thirsting for product authentication solutions that can help consumers to distinguish genuine products from fake ones. If the solution makes it handy for the consumer to authenticate product, the counterfeits will be easily driven out of the market.

Anti-counterfeit is a very hot topic in patent applications and many solutions have already been seen in the market. Before the wide adoption of computer communication network, the anti-counterfeit solutions are in general based on physical means, e.g. special printing ink, paper, texture and laser label. Such physical means are alleged by the solution providers as strong against counterfeit. But, past decades of history clearly disagree with those providers' allegation. The bank note is a very good example. The most advanced physical means can always be found in the bank note. However, fake bank notes never disappear. Apparently, ordinary product manufacturers cannot stand the high cost that applies to bank note anti-counterfeit. Therefore, anti-counterfeit solutions adopted by ordinary product manufacturers are very vulnerable.

In past 20 years, computer communication networks successfully break through to the consumer market. Global Internet access fee and fix/mobile telecommunication fee get so low that they are affordable to a large portion of the people living on the planet. Consequently, it's not surprising to see more and more anti-counterfeit solutions that try to transmit product authentication information conveyed by the product to a backend server and let the server decide whether the product is real or fake. For example Chinese patent applications 99126659 and 0211542 fall in this class of technique.

RFID tag is another rising star in fighting against counterfeits. The term RFID covers a family of radio and processor technologies that have widely varying amounts of computational power, read range, and cost. Supply chain tags have been famous since WalMart and U.S. Department of Defense started large scale trials. The industry body EPCglobal (www.epcglobaline.org) has defined Class 0 and Class 1 RFID tags that have extremely limited computation, storage, and communication capabilities, with no support for cryptography and minimal additional features.

Three components are fundamental to any RFID system: the RFID tag, the RFID reader and the data processing subsystem. The RFID tag is located on the object to be identified and is the data carrier in the RFID system. The RFID reader is able to read data from and/or write data to the RFID tag. The data processing subsystem utilizes the data obtained by the RFID reader in some useful manner.

Typical RFID tags include a microchip that stores data and a coupling element, such as a coiled antenna, for communicating via radio frequency communication. RFID tags may be either active or passive. Active RFID tags have an on-tag power supply (such as a battery) and actively send an RF signal for communication, while passive RFID tags obtain all of their power from the interrogation signal of the RFID reader and either reflect or load modulate the RFID reader's signal for communication. Most RFID tags, both passive and active, communicate only when they are interrogated by an RFID reader.

Typical RFID readers include a radio frequency module, a control unit, and a coupling element to interrogate RFID tags via radio frequency communication. In addition, many RFID readers are fitted with an interface that enables them to communicate their received data to a data processing subsystem, e.g., a database running on a personal computer. The use of radio frequencies for communication with RFID tags allows RFID readers to read passive RFID tags at small to medium distances and active RFID tags at small to large distances even when the tags are located in a hostile environment and are obscured from view.

Anti-counterfeit solutions that utilize RFID tag could be simply classified as online ones and offline ones. For the online anti-counterfeit solutions, computer communication networks are used as well. Such solutions may or may not entail security means. For example, Chinese patent applications 200410082611.1 and 200410024790.3 fall in this class of technique, while the former does not touch security means and the latter mandates security means. On the other hand, for the offline solutions, computer communication networks are not utilized, i.e. only the RFID tag and reader are utilized to authenticate products. In this case, security means are inevitably necessary. For example, Chinese patent applications 03111875.5 and 200410078160.4 fall in this class of techniques. PCT patent application WO 2005/024697 A2 is also of this class.

Existing anti-counterfeit solutions have problems in terms of cost, efficiency, usability and security.

Above all, any anti-counterfeit solution that mandates communication network support will encounter big cost on the backend server so as to handle mass product authentication queries from the consumers. Further, the communication expense will be imposed on either the consumer or the product manufacturer. If it's imposed on the consumer, such solutions will be abandoned by most of the consumers for obvious economic reasons. On the other hand, if it's imposed on the product manufacture, the mass product authentication queries from the consumers may eat up the profit of the product manufacture. That's not all. In most cases, the communication between the consumer and the backend server for product authentication takes significant time. Consumers may also turn away from such kind of solutions for time reasons.

Existing offline tag-based anti-counterfeit solutions, i.e. solutions that do not need communication network support, encounter cost as well as security troubles. Although security means have been incorporated in such kind of solutions, most of them actually are not working. Such kind of solutions generally relies on the assumption that the tag contains certain secret information and is clone-resistant, i.e. given a genuine tag containing secret information it's hard to fabricate another tag that contains the same information. If such assumption is true, those solutions are doable because security means guarantee that the secret information stored in the tag is not forgeable therefore the secret information and the tag is securely bound. Unfortunately, this assumption is totally incorrect for existing solutions. Existing solutions use all the secret information stored in the tag for product authentication. As we know, for an offline solution, it's the reader that authenticates the tag and make judgment on the authenticity of the product being attached the tag. Since all the secret information stored in the tag is used in authentication, if any one of the reader is occupied by the forger, the forger may figure out the secret information stored in the reader, exactly copy the secret information to a fake tag and in the sequel break the security of the solution. Fabricating a secure reader against conquering by the forger is possible. However, such a reader is too expensive. Similarly, it is easy to find that the radio communication between the reader and the tag is hard to be secured by security means. If the radio communication between the reader and the tag is secure, not only an expensive reader but also expensive tags are necessary for them to authenticate each other. As the consequence, the data contained in the tag could be intercepted through simply eavesdropping of the open radio communication between the reader and the tag. We conclude that an RFID tag is prone to be cloned unless an expensive tag that can authenticate the reader as well as authenticated by the reader is utilized and the radio channel between the reader and the tag is encrypted.

Here we emphasize that the inexpensive tag are at least characterized by "passive tag that has very limited computation power". Fundamental security requirements such as pseudorandom number generation, hashing and ciphering are not available to the tag. For such an inexpensive tag, anti-clone of data is painful to all product authentication solutions. Cloned tags are fatal to especially the offline ones. The reader without network support cannot distinguish a genuine tag from a cloned one, which implies that the fake tag will definitely pass the product authentication by any genuine reader. Consequently, mass counterfeits are inevitable because a counterfeit being attached a cloned tag will be authenticated by the reader as authentic.

Some solutions addressed to the problem of data clone of offline RFID tags have been proposed. For example, Japanese Patent Publication 2005-130059 discloses a solution, which, by writing a plurality of encrypted data into a storage area of an IC chip attached to a product and reading the encrypted data in the chip for a number of times, increases the difficulty of interpreting encrypted data and thus increases the difficulty of data clone to some extent. However, data clone is still possible. The forger can obtain all the encrypted data stored in a genuine chip by reading the chip for enough number of times, and clone the data into the fake chip. A chip thus forged can definitely pass the product authentication by any genuine reader.

Therefore, there is a demand for an RFID system for offline product authentication, which can prevent cloning of data stored in an RFID tag, and has the advantages such as cheapness and efficiency.

SUMMARY OF THE INVENTION

In order to solve the above problems, that is, to prevent cloning of data stored in a radio frequency identification tag by means of an inexpensive and efficient solution, a radio frequency identification system, a radio frequency identification tag and a radio frequency identification method are provided.

According to a first aspect of the invention, there is provided a radio frequency identification system, comprising: a radio frequency identification tag having an identification code and a set of verifiable data stored therein; and a radio frequency identification reader which sends a reading request to the radio frequency identification tag, requesting to read a first portion of the set of verifiable data, wherein the radio frequency identification tag further comprising control means, which, when the radio frequency identification tag receives the reading request from the radio frequency identification reader, in case of that the set of verifiable data has not been performed a locking operation, performs the locking operation on the set of verifiable data, so that from then on any data of a second portion of the set of verifiable data cannot be read.

According to a second aspect of the invention, there is provided a radio frequency identification tag having an identification code and a set of verifiable data stored therein, wherein the radio frequency identification tag further comprising control means, which, when the radio frequency identification tag receives a reading request that requests to read a first portion of the set of verifiable data, in case of that the set of verifiable data has not been performed a locking operation, performs the locking operation on the set of verifiable data, so that from then on any data of a second portion of the set of verifiable data cannot be read.

According to a third aspect of the invention, there is provided a radio frequency identification method, comprising: storing an identification code and a set of verifiable data in a radio frequency identification tag; and a radio frequency identification reader sends a reading request to the radio frequency identification tag, requesting to read a first portion of the set of verifiable data, wherein the radio frequency identification upon receiving a reading request from the radio frequency identification reader, in case of that the set of verifiable data has not been performed a locking operation, performs a locking operation on the set of verifiable data, so that from then on any data of a second portion of the set of verifiable data cannot be read.

According to a forth aspect of the invention, there is provided a radio frequency identification system, comprising: a radio frequency identification tag having an Identification code and m sets of verifiable data stored therein; and a radio frequency identification reader which sends a reading request to the radio frequency identification tag, requesting to read a portion of each of t sets of verifiable data of the m sets of verifiable data, wherein the radio frequency identification tag further comprising control means, which, when the radio frequency identification tag receives the reading request from the radio frequency identification reader, in case of that the t sets of verifiable data have not been performed a locking operation, performs the locking operation on the t sets of verifiable data, so that from then on another portion of each of the t sets of verifiable data cannot be read.

According to a fifth aspect of the invention, there is provided a radio frequency identification tag having an Identification code and m sets of verifiable data stored therein, wherein the radio frequency identification tag further comprising control means, which, when the radio frequency identification tag receives a reading request that requests to read a portion of each of t sets of verifiable data of the m sets of verifiable dat, in case of that the t sets of verifiable data have not been performed a locking operation, performs the locking operation on the t sets of verifiable data, so that from then on another portion of each of the t sets of verifiable data cannot be read.

According to a sixth aspect of the invention, there is provided a radio frequency identification method, comprising: storing an Identification code and m sets of verifiable data in a radio frequency identification tag; and a radio frequency identification reader sends a reading request to the radio frequency identification tag, requesting to read a portion of each of t sets of verifiable data of the m sets of verifiable data, wherein the radio frequency identification tag upon receiving the reading request from the radio frequency identification reader, in case of that the t sets of verifiable data have not been performed a locking operation, performs the locking operation on the t sets of verifiable data, so that from then on another portion of each of the t sets of verifiable data cannot be read.

According to the embodiments of the present invention, a locking function is introduced into the radio frequency identification tag. As thus, cloning of data in the radio frequency identification tag can be effectively prevented and mass counterfeits can be thwarted through a plurality of digital signatures stored in the radio frequency identification tag and the locking function carried out by the radio frequency identification tag.

DETAILED DESCRIPTION OF THE PREFERRED EMBODIMENTS

The embodiments of the invention will be explained below.

Figure 1:
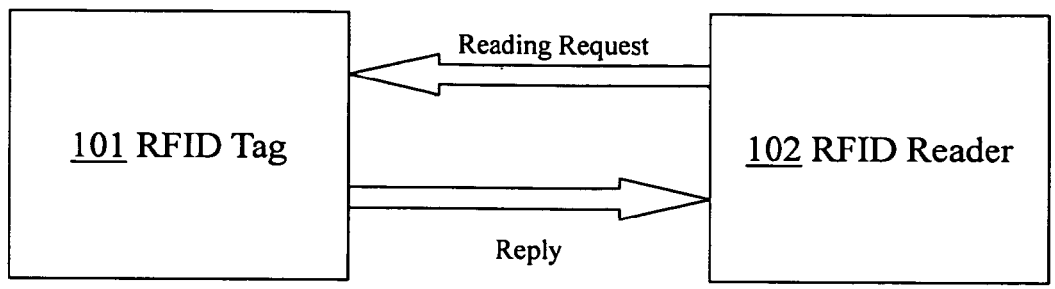
FIG. 1 shows an RFID system 100 comprising an RFID tag 101 and an RFID reader 102 according to a first embodiment of the invention.

FIG. 1 is a simplified block diagram showing an RFID system 100 according to a first embodiment of the invention. The RFID system 100 comprises an RFID tag 101 and an RFID reader 101, which communicate with each other through radio frequency communication. The RFID tag 101 is a passive tag, which obtains all of its power from a reading request signal from the RFID reader 102 and either reflect or load modulate the RFID reader 102's signal in order to make response. The RFID tag 101 has a very small size and can be attached to any product to be authenticated. The RFID reader 102 can sends data, such as the reading request, to the RFID tag 101, and receive any reply data from the RFID tag 101.

Figure 2:
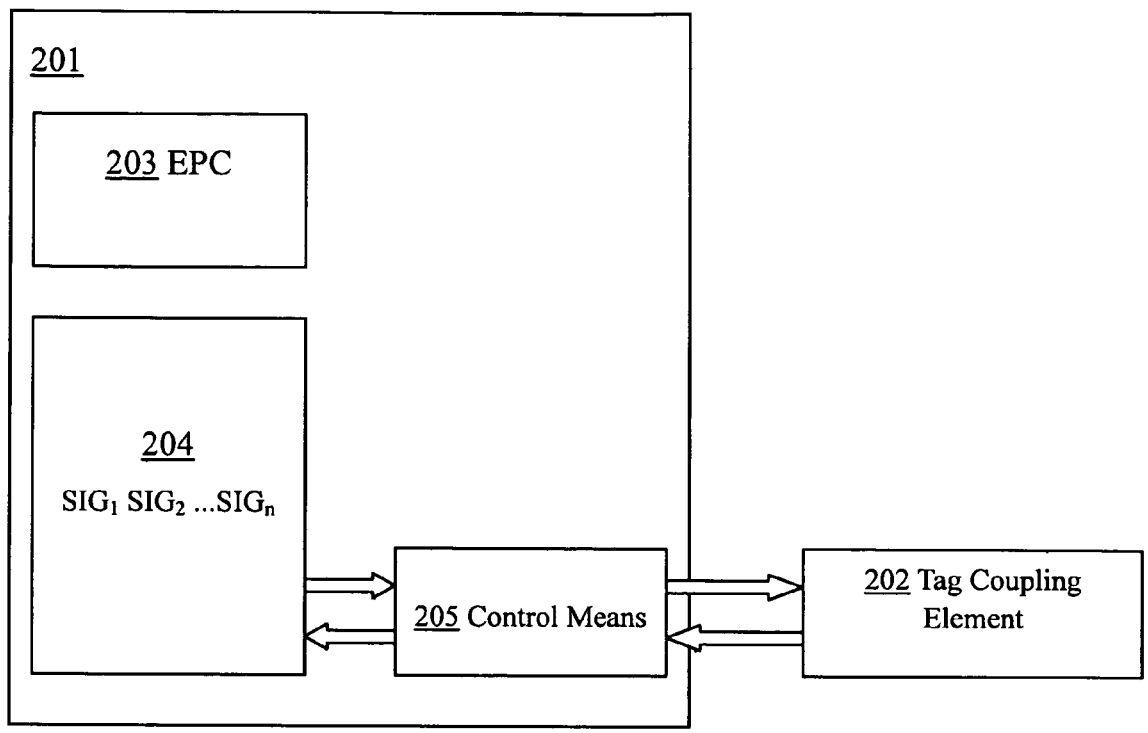
FIG. 2 is a schematic diagram showing the internal structure of the RFID tag 101 according the first embodiment of the invention.

FIG. 2 is a schematic diagram showing the internal structure of the RFID tag 101 shown in FIG. 1. The RFID tag 101 comprises a microchip 201 and a tag coupling element 202. The microchip 201 includes an identification code storage area 203, a supplementary storage area 204 and control means 205. An attribute identification code uniquely identifying the RFID tag 101, such an EPC code, is stored in the identification code storage area.

The EPC code is defined by EPCglobal. A portion of the EPC code will uniquely identify the manufacturer of the product being attached the RFID tag 101. EPC is the only information stored in the RFID tag, and has been supported by UCC and International EAN, two major surveillance organizations for international standards. The object of EPC is to provide an unique identity for an object of the physical world. It identifies and accesses a single object through computer networks in the similar manner as identifying, organizing and communicating through IP addresses in an internet. The structure of an EPC code will be explained briefly below. EPC is a set of digits, consisting of a head mark and three portions of data. The head mark indicates the version number of the EPC, and has taken into consideration the different lengths and types of future tags. The second portion indicates the administrator of the EPC, corresponding to the manufacturer of the product. The third portion represents the class of the product, indicating the exact categorization of the product. The forth portion is the sequence number of a product item. For example, an EPC code 01.115A1D7.28A1E6.421CBA30A, wherein 01 represents the version of the EPC (8 bits), 11511D7 represents the identification code of the manufacturer of the product and includes 28 bits in total (capable of representing more than 268 millions of manufacturers), 28A1E6 represents the identification code of the product and includes 24 bits in total (each manufacturer can have more than 16 millions of classes of products represented), and 421CBA30A represents the sequence number of the product item and includes 36 bits in total (each class of product can have more than 68 billions of items represented).

Stored in the supplementary storage area 204 are verifiable data as well as other supplementary information, e.g. date of manufacture. A number of ways exist for generating the verifiable data. The examples thereof will be described below.

In a preferred embodiment of the present invention, the verifiable data can be digital signatures. As shown in FIG. 2, a number (e.g. n, n is a positive integer and n>1) of digital signatures $\{SIG_1, SIG_2, \ldots, SIG_n\}$ are stored in the supplementary storage area.

Assume that each manufacturer has at least one public-key, and the digital signatures are digital signatures on the content of EPC. These signatures are verified by the public-keys of the manufacturer. For example, assume n=2, that is, there are 2 digital signatures $SIG_1$ and $SIG_2$ stored in the storage area 204 and the manufacturer has two RSA public-keys, $PK_1$ and $PK_2$, each of 1024 bits. Then $SIG_1$ and $SIG_2$ could be digital signatures on EPC and date of manufacture that can be verified by $PK_0$ and $PK_1$. Each signature consumes 1024 bits. Preferably, the signatures are computed using ECDSA (ANSI X9.62) akin mechanisms so that one manufacture requires only one public-key. According to the mechanisms, each signature has two portions S and C, each of e.g. 160 bits if using 160 bits elliptic curve and SHA-1. In other words, one digital signature consumes only 320 bits. However, the security strength is comparable to the security of 1024 bit RSA digital signature scheme. Examples on computation methods of portion S and portion C will be given later. Such various choices and considerations on digital signature schemes are well known to those skilled in the art.

Besides generating as digital signatures, the way of generating the verifiable data can alternately be the MAC (Message Authentication Code) method well known in the art. For example, given a secure hashing function and a message M (including an EPC code E and any possible additional information), n pieces of verifiable data can be computed as $MAC_i$=hash (M, key, i), i=1, 2, ... n. $MAC_1 \sim MAC_n$ are stored in the tag as verifiable data. When the reader reads any one of the pieces of verifiable data, for example, $MAC_j$, whether $MAC_j$ equals to hash (M, key, j) can be verified based on the sequence number j of the MAC value, the associated message M and the secret key "key" in the reader's own memory. If the answer is "YES", then this MAC value is genuine. Otherwise, this MAC value is fake. MAC can be generated by other methods, for example, HMAC, and there are a lot of choices for the secure hashing function. All these are well known to those skilled in the art.

As another example, the way of generating the verifiable data can alternately be the symmetric encryption method as well known in the art. Specifically, given a symmetric encryption function SEC, a decryption function SDE, and a message M (including an EPC code E and any possible additional information), n pieces of verifiable data can be computed as $D_i$=SEC (M, key, i), i=1, 2, ... n. $D_1 \sim D_n$ are stored in the tag as verifiable data. When the reader reads any one of the pieces of verifiable data, for example, $D_j$, whether SDE (Dj, key) can decrypt M and j can be verified based on the sequence number j of the data, the associated message M and the secret key "key" in the reader's own memory. If the answer is "YES", then this piece of verifiable data is genuine. Otherwise, it's fake. There are a lot of choices for the symmetric encryption method, for example, 3DES and AES, all of which are well known to those skilled in the art.

The above schemes for generating the verifiable data without using digital signatures can be extended as follows: a number of secret keys belonging to different manufactures are stored in the reader, and the verifiable data stored in the tag which declares in its EPC that it belongs to a manufacture can be verified by the secret key of the manufacture stored in the reader.

The main problem with the above verifiable data generating schemes without the use of digital signatures is that the extendibility of these schemes is very poor if each manufacture has different secret keys. If a reader stores secret keys of thousands of manufactures, then it will become a huge security issue. Meanwhile, it is difficult to add secret keys to the reader in a secure manner. On the other hand, the scheme of sharing one secret key among all the manufactures is also very poor in the extendibility. This is because that in this case the secret key can only be used by a commonly recognized trustworthy third party, which makes it necessary for the third party to generate verifiable data for all the products of all the manufacturers and which is also very difficult.

Therefore, using digital signatures as verifiable data is preferred in the present invention.

The control means 205 is used to perform a locking operation, which causes a portion of digital signatures stored in the supplementary storage area 204 of the RFID tag can not be read from then on depending on the condition when the RFID tag 101 receives a reading request from the RFID reader. The operations of the control means 205 will be further described below in conjunction with FIG. 4.

The tag coupling element 202 can be a coiled antenna for communicating with the RFID reader 102 through radio frequency communication.

Figure 3:
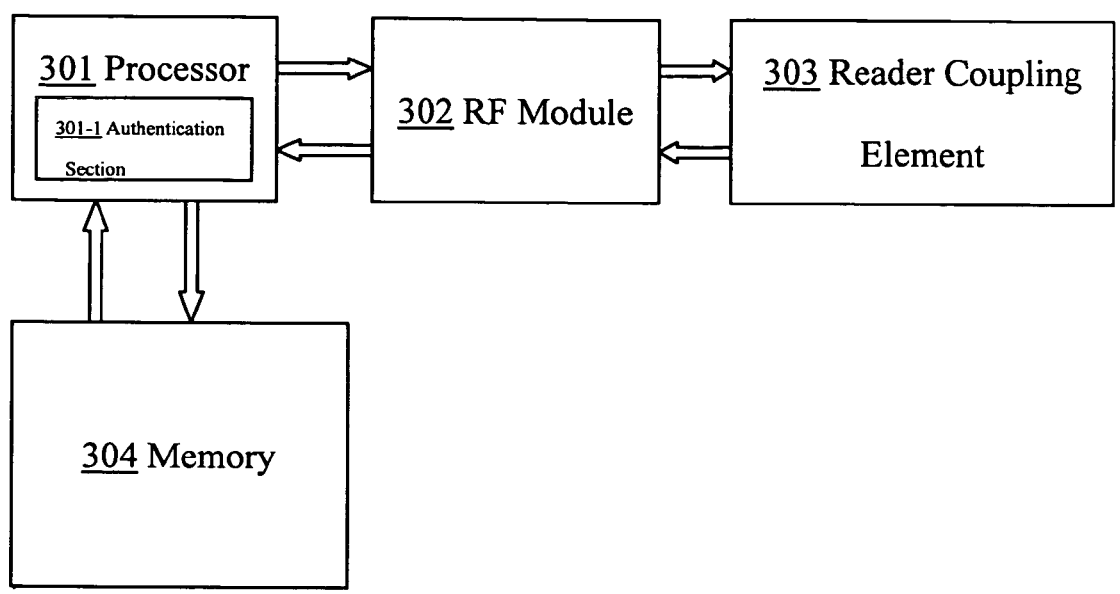
FIG. 3 is a schematic diagram showing the internal structure of the RFID reader 102 according the first embodiment of the invention.

FIG. 3 is a schematic block diagram showing the internal structure of the RFID reader 102 shown in FIG. 1. The RFID reader 102 comprises a processor 301, a radio frequency module 302, a reader coupling element 303 and a memory 304. The processor 301 is for controlling the RFID reader 102 to send a reading request to the RFID tag 101 via the coupling element 303. The processor 301 further comprises an authentication section 301-1 for analyzing the reply data received from the RFID tag 101 to authenticate the RFID tag 101 so as to authenticate the product being attached the RFID tag 101. The operations of the processor 301 will be further described below in conjunction with FIG. 5. The radio frequency module 302 is used to generate radio frequency signals under the control of the processor 301. The reader coupling element 303 is used to communicate with the RFID tag 101 by transmitting/receiving radio frequency signals. The memory 304 is for storing the public keys of the manufactures. In case of using RSA algorithm to compute the digital signatures, corresponding to n digital signatures stored in the supplementary storage area 204 of the RFIG tag 101, there are n public keys $\{PK_1, PK_2, \ldots, PK_n\}$ stored in the memory 304. However, in case of using ECDSA algorithm to compute the digital signatures, no matter how many digital signatures are stored in the supplementary storage area 204, for one manufacture, only one public key is required to be stored in the memory 304 for verifying the digital signatures of that manufacture.

Figure 4:
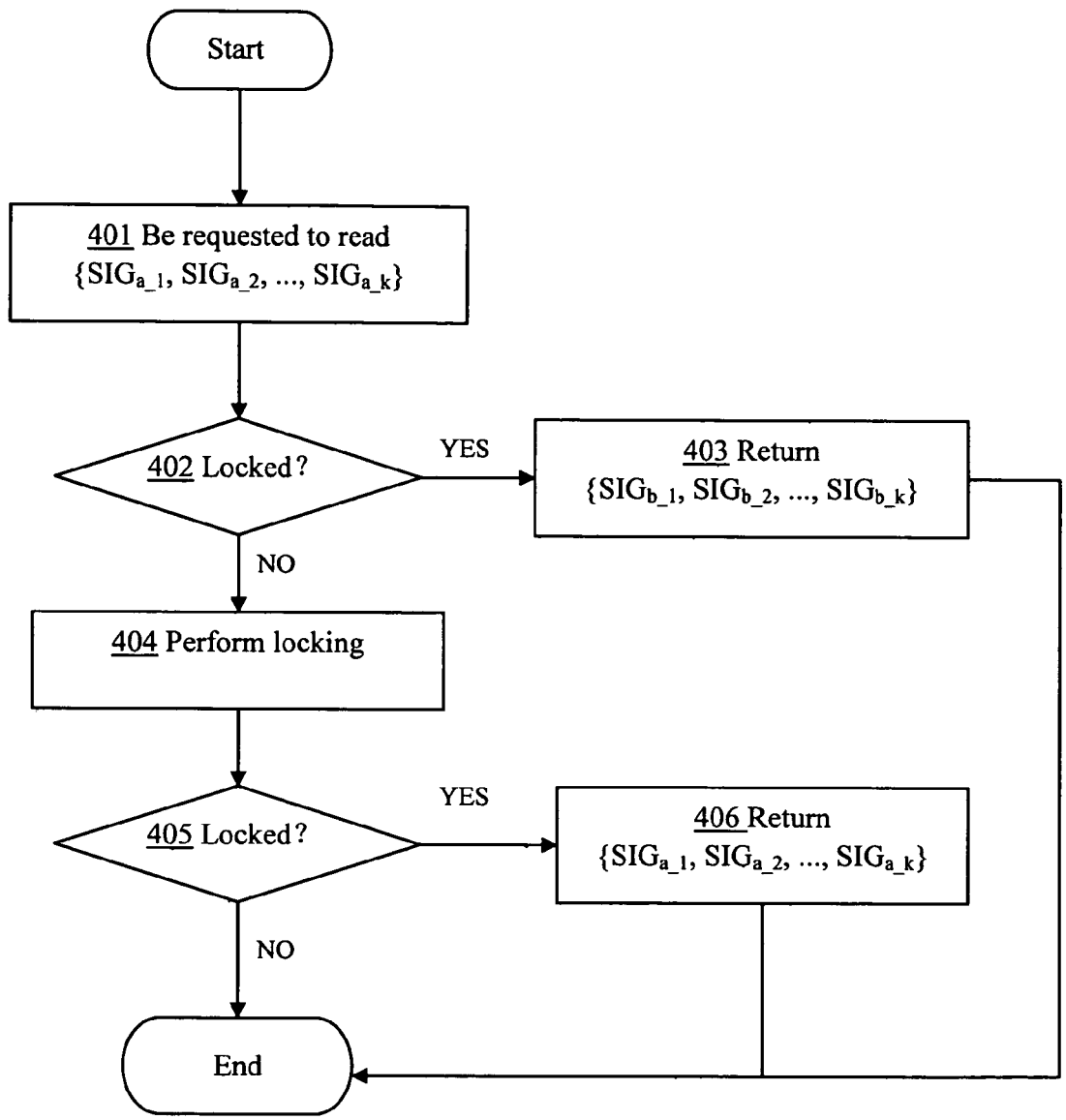
FIG. 4 is a flow chart showing the operations of the RFID tag 101 upon receiving a reading request from the RFID reader 102.

FIG. 4 is a flow chart showing the operations of the RFID tag 101 shown in FIG. 1 upon receiving a reading request from the RFID reader 102. In step 401, the RFID tag 101 receives the reading request from the RFID reader 102 and is requested to read a subset of digital signatures including k digital signatures $\{SIG_{a\_1}, SIG_{a\_2}, \ldots, SIG_{a\_k}\}$, wherein k is a positive integer and $1 \leq k \leq n$, and $\{a\_1, a\_2, \ldots, a\_k\} \subset \{1, 2, \ldots, n\}$, i.e., $\{SIG_{a\_1}, SIG_{a\_2}, \ldots, SIG_{a\_k}\} \subset \{SIG_1, SIG_2, \ldots SIG_n\}$. In step 402, the control means 205 determines whether the set of digital signatures $\{SIG_1, SIG_2, \ldots, SIG_n\}$ has been locked to another subset of digital signatures $\{SIG_{b\_1}, SIG_{b\_2}, \ldots, SIG_{b\_k}\}$ due to being performed a locking operation. If it has been locked, then the RFID tag 101 sends the subset of digital signatures $\{SIG_{b\_1}, SIG_{b\_2}, \ldots, SIG_{b\_k}\}$ to the RFID reader 102 in step 403. Then the process ends. If it has not been locked, then in step 404, the control means 205 performs the locking operation to lock the set of digital signatures $\{SIG_1, SIG_2, \ldots, SIG_n\}$ in the RFID tag 101 to the subset of digital signatures $\{SIG_{a\_1}, SIG_{a\_2}, \ldots, SIG_{a\_k}\}$. As a result, when a reading request is received in the future, only the subset of digital signatures $\{SIG_{a\_1}, SIG_{a\_2}, \ldots, SIG_{a\_k}\}$ can be read, while other digital signatures in the set of digital signatures $\{SIG_1, SIG_2, \ldots, SIG_n\}$ can not be read any more. Next, in step 405, the control means 205 determines whether the RFID tag 101 has been locked. If it has not been locked, no operation is performed and the process ends. If it has been locked, the process proceeds to step 406, where the subset of digital signatures $\{SIG_{a\_1}, SIG_{a\_2}, \ldots, SIG_{a\_k}\}$ is sent to the RFID reader 102. Then the process ends. In the first embodiment of the invention, the control means 205 performs the locking for example in the following manner: the control means 205 sets a corresponding flag bit $F_i$ with an initial value of 0 for each digital signature $SIG_i$, and when $SIG_i$ is read for the first time, its corresponding flag bit $F_i$ is set to 1, and when the number of digital signatures with a flag bit of 1 reaches k, the digital signatures with a flag bit other than 1 can not be read any more. The manners for rendering the digital signatures unreadable include for example destroying them, e.g. resetting them to zeroes. The locking can be performed in other ways. For example there are no explicit flag bits in the tag and all the unreadable digital signatures are directly destroyed, e.g. reset to zeroes. Digital signatures all being zeroes may be determined by the tag as digital signatures that do not need to be sent to the reader, or they may be determined by the reader as digital signatures prohibited to be read in case of having been sent by the tag. The effects are both causing the digital signatures unreadable to the reader. It is apparent to those skilled in the art that the locking operation can be carried out in other manners in software, hardware or the combination thereof. The present invention is not limited to the specific manners of locking illustrated herein as examples. Note that it is also possible that the RFID tag 101 receives a reading request which requests to read another number, e.g. k', of digital signatures, however, no matter k' equals to k or not, the RFID tag 101 will permit at most k digital signatures to be read.

Figure 5:
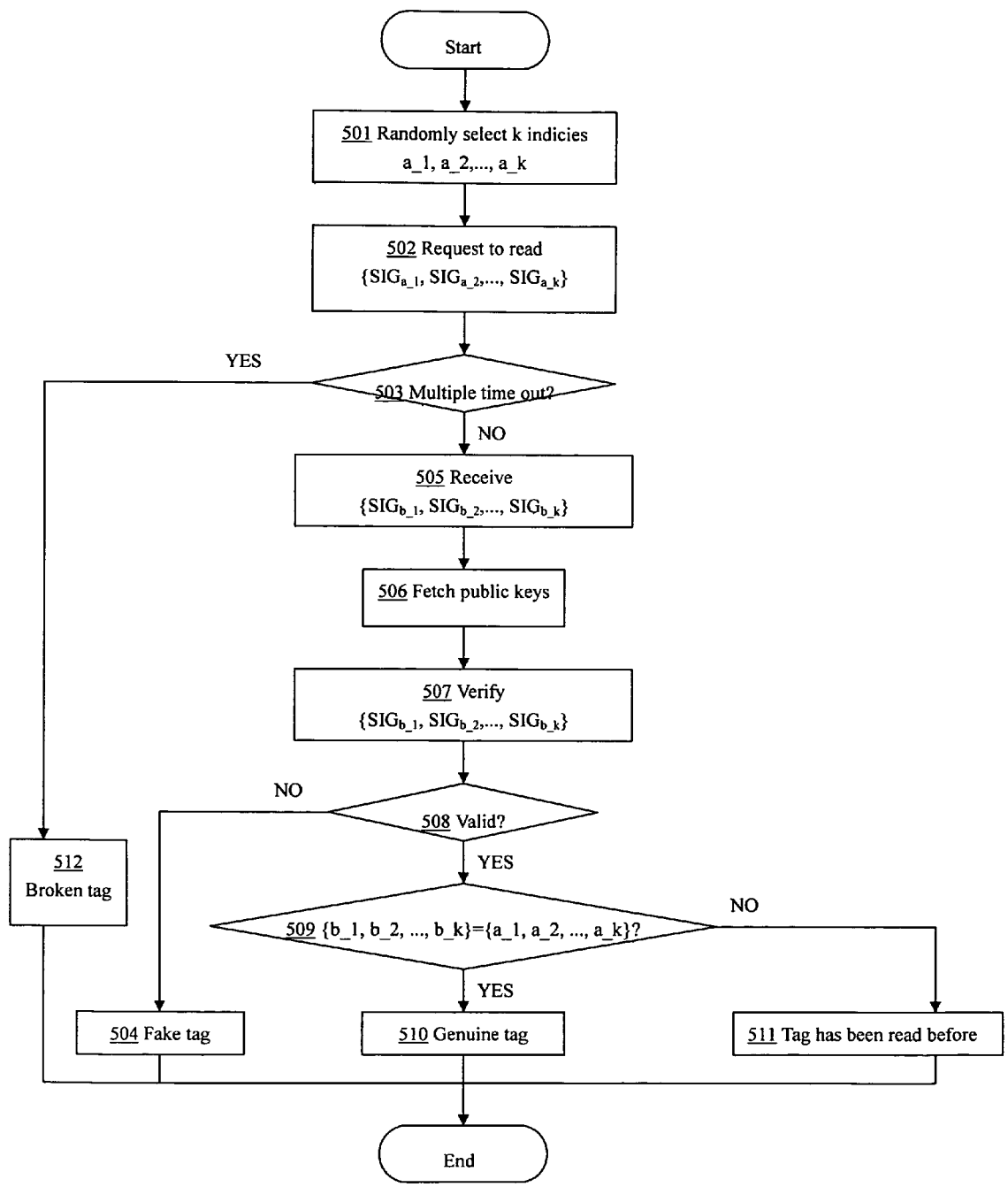
FIG. 5 is a flow chart showing the operations of the RFID reader 102 for sending the reading request to the RFID tag 101 and authenticating the RFID tag 101 based on the read digital signatures.

Corresponding to the operation flow of the RFID tag 101 shown in FIG. 4, FIG. 5 is a flow chart showing the operations of the RFID reader 102 for sending the reading request to the RFID tag 101 and authenticating the RFID tag 101 based on the data received from the RFID tag 101. It is assumed herein that the RFID reader 102 has successfully read the identification code, e.g. the EPC code, from the RFID tag 101, thus has determined an attribute uniquely identifying the RFID tag 101, and therefore has determined which public key or which set of public keys stored in the memory should be used to verify the read digital signatures. In step 501, the processor 301 of the RFID reader 102 randomly selects a subset of indices $\{a\_1, a\_2, \ldots, a\_k\}$ from the set of indices $\{1, 2, \ldots, n\}$. Then in step 502, the processor 301 controls the RFID reader 102 to send a reading request to the RFID tag 101 through the reader coupling element 303, requesting to read a subset of digital signatures $\{SIG_{a\_1}, SIG_{a\_2}, \ldots, SIG_{a\_k}\}$, and starts to wait for the reply data from the RFID tag 101. In step 503, the processor 301 determines whether it has been timed out for multiple times. If the answer is "YES", the process proceeds to step 512, where the authentication section 301-1 judges that the RFID tag 101 to be broken. The times of time out before the tag being judged as broken can be selected as needed. The manners of selecting are well known to those skilled in the art. If, in step 503, a subset of digital signatures $\{SIG_{b\_1}, SIG_{b\_2}, \ldots, SIG_{b\_k}\}$ sent from the RFID tag 101 was received before multiple times of time out are determined (step 505), then in step 506, the processor 301 fetches the public keys corresponding to the manufacturer from the memory 304. Next, in step 507, the subset of digital signatures $\{SIG_{b\_1}, SIG_{b\_2}, \ldots, SIG_{b\_k}\}$ is verified by using the public keys of the manufacturer. In step 508, the validity of the subset of digital signatures $\{SIG_{b\_1}, SIG_{b\_2}, \ldots, SIG_{b\_k}\}$ is judged. If it's invalid, then the authentication section 301-1 judges that the RFID tag 101 is a fake tag, thus the product being attached the RFID tag 101 is a fake product (step 504). If it's valid, then in step 509, it is determined whether the subset of indices $\{b\_1, b\_2, \ldots, b\_k\}$ equals to the subset of indices $\{a\_1, a\_2, \ldots, a\_k\}$ randomly selected in step 501. If the answer is "YES", then the authentication section 301-1 judges that the RFID tag 101 is a genuine tag (step 510). Otherwise, the authentication section 301-1 judges that the RFID tag 101 has been read before (step 511). Through the above process, the RFID reader 102 can authentication the authenticity of the RFID tag 101.

It can be seen from the above description that, the outcome of performing the "locking" operation in the tag is that tag cloning is prohibited. First, take k=1 as an example for computing the probability of detecting fake products. A forger can only obtain one of all n digital signatures stored in a genuine tag. Other n−1 digital signatures will never be read. Therefore, a fake tag will only contain one valid digital signature. Hence cloned tag is no more seen. When such a fake tag is authenticated by a genuine reader, since the reader will randomly select i from $\{1, 2, \ldots n\}$, and request to read $SIG_i$, the fake tag will be detectable at probability $(n-1)/n$. In general, p fake tags are detectable at probability $1-(1/n)^p$. Taking n=2 as example, one fake tag can escape detection at a probability of 50%, while a dozen fake tags can only escape detection at a probability lower than 0.025%. Or in other words, a dozen fake tags are detectable at a probability higher than 99.97%. Obviously, if $1<k<n*0.5$, then the probability that the fake tags will be detected will be even higher. When $k=n*0.5$, the probability of detection is highest. For example, n=12, i.e., there are 12 digital signatures stored in a tag, and k=6, i.e. 6 digital signatures are randomly selected for authentication from the 12 digital signatures. Since there are at most 6 digital signatures in a fake tag, the fake tag will be detectable at a probability of $1-1/C_{12}^6$, i.e., 99.89%. At this time, two fake tags can escape detection at a probability lower than 0.00012%. It's now rational to conclude that the solution of authenticating products by using an RFID system including an RFID tag with locking function as provided by the invention can effectively and efficiently thwarts mass counterfeits.

Figure 6:
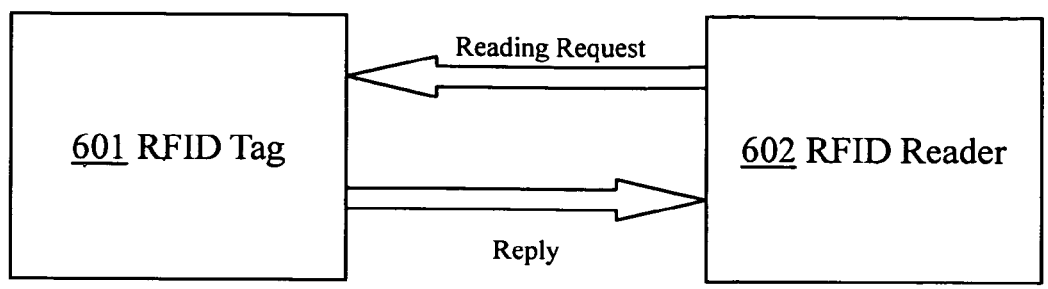
FIG. 6 shows an RFID system 600 comprising an RFID tag 601 and an RFID reader 602 according to a second embodiment of the invention.
Figure 7:
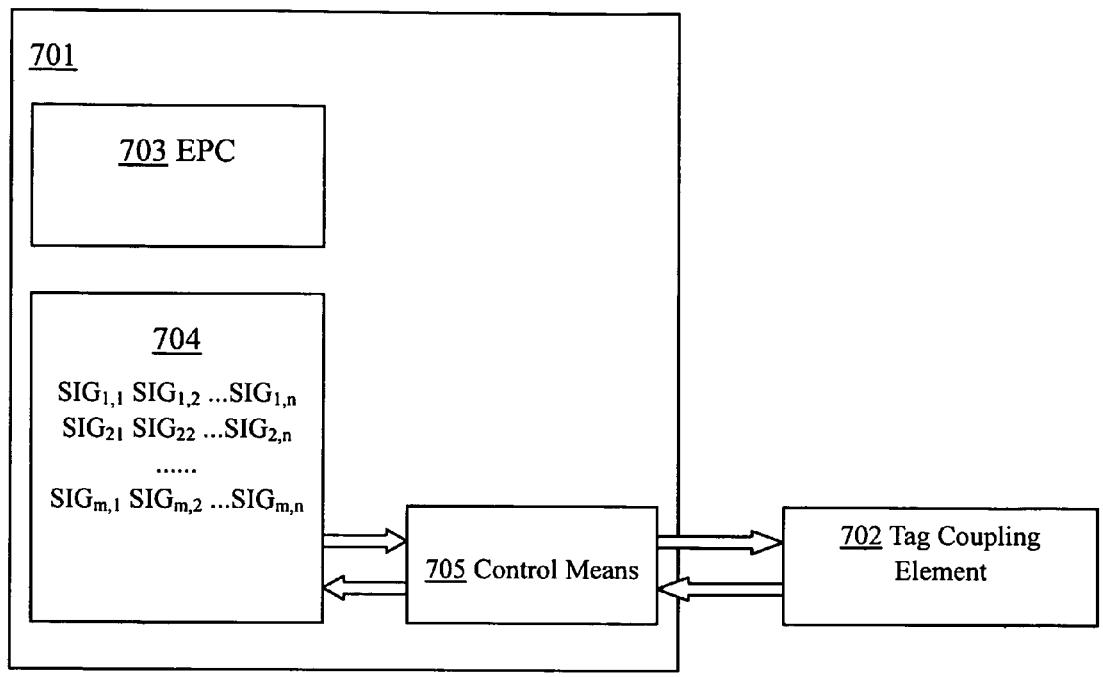
FIG. 7 is a schematic diagram showing the internal structure of the RFID tag 601 according the second embodiment of the invention.
Figure 8:
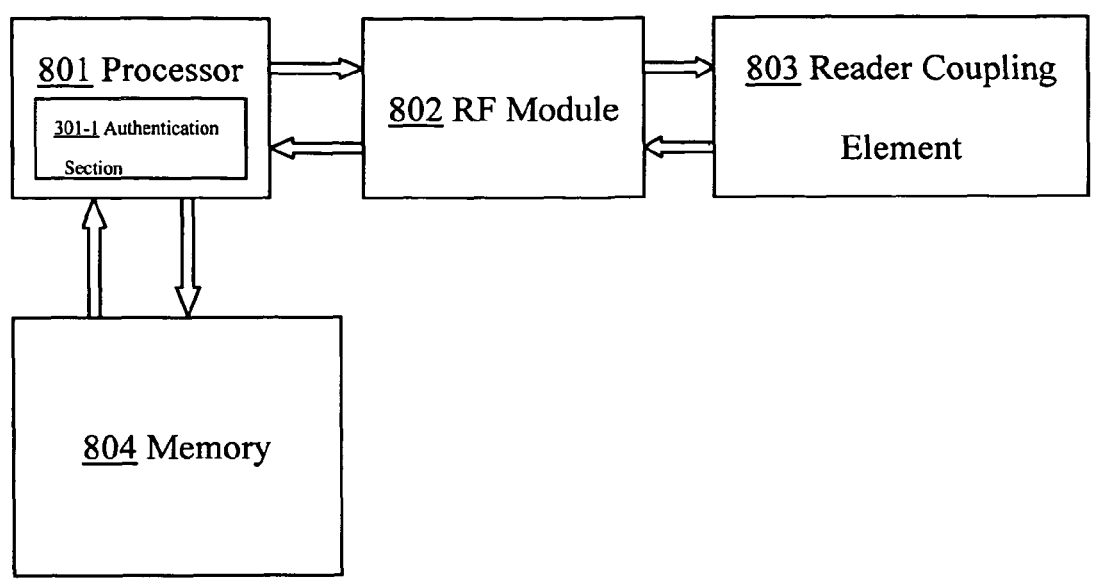
FIG. 8 is a schematic diagram showing the internal structure of the RFID reader 602 according the second embodiment of the invention.

In a second embodiment of the invention, the RFID tag contains another m−1 sets of digital signatures besides the set of digital signatures {$SIG_1$, $SIG_2$, ..., $SIG_n$}, where m is a positive number and m>1, and the construction manner of each set of digital signatures is the same as that of the set of digital signatures {$SIG_1$, $SIG_2$, ..., $SIG_n$}. FIG. 6 shows an RFID system 600 comprising an RFID tag 601 and an RFID reader 602 according to the second embodiment of the invention. FIG. 7 is a schematic diagram showing the internal structure of the RFID tag 601 according the second embodiment of the invention. FIG. 8 is a schematic diagram showing the internal structure of the RFID reader 602 according the second embodiment of the invention. As shown in FIG. 7, the RFID tag 601 comprises a microchip 701 and a tag coupling element 702. The microchip 701 includes an identification code storage area 703, a supplementary storage area 704 and control means 705. Stored in the supplementary storage area 704 of the RFID tag 601 are m sets of n digital signatures, forming a matrix of digital signatures {$SIG_{i,j}$}, where $1 \leq i \leq m$, $1 \leq j \leq n$. As shown in FIG. 8, the RFID reader 602 comprises a processor 801, a radio frequency module 802, a reader coupling element 803 and a memory 804. The processor 801 further comprises an authentication section 801-1.

Figure 9:
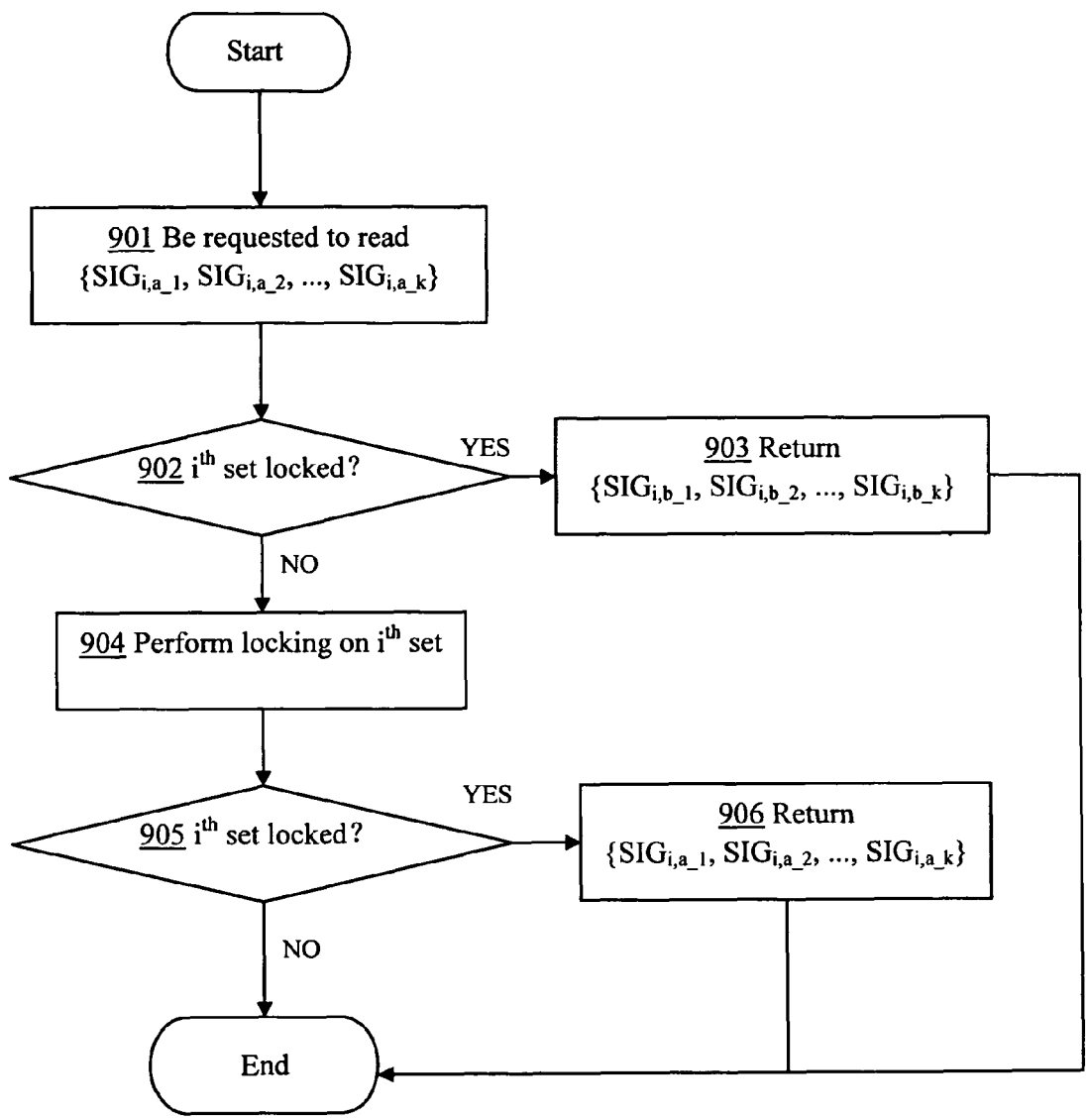
FIG. 9 is a flow chart showing the operations of the RFID tag 601 upon receiving a reading request from the RFID reader 602.

For each set of digital signatures, as shown in FIG. 9, the operations of the RFID tag 601 are similar to the operations of the RFID tag 101 described above in conjunction with FIG. 4. FIG. 9 is a flow chart showing the operations of the RFID tag 601 shown in FIG. 6 upon receiving a reading request from the RFID reader 602. In step 901, the RFID tag 601 receives the reading request from the RFID reader 602 and is requested to read a subset of digital signatures {$SIG_{i,a\_1}$, $SIG_{i,a\_2}$, ..., $SIG_{i,a\_k}$} of the $i^{th}$ set of digital signatures, where $1 \leq i \leq m$, $1 \leq k \leq n$ and {$a\_1, a\_2, ..., a\_k$} ⊂ {$1, 2, ..., n$}, i.e., {$SIG_{i,a\_1}, SIG_{i,a\_2}, ..., SIG_{i,a\_k}$} ⊂ {$SIG_{i,1}, SIG_{i,2}, ... SIG_{i,n}$}. In step 902, the control means 705 determines whether the $i^{th}$ set of digital signatures {$SIG_{i,1}, SIG_{i,2}, ..., SIG_{i,n}$} has been locked to another subset of digital signatures {$SIG_{i,b\_1}, SIG_{i,b\_2}, ..., SIG_{i,b\_k}$} due to being performed a locking operation. If it has been locked, then the RFID tag 601 sends the subset of digital signatures {$SIG_{i,b\_1}, SIG_{i,b\_2}, ..., SIG_{i,b\_k}$} to the RFID reader 602 in step 903. Then the process ends. If it has not been locked, then in step 904, the control means 705 performs the locking operation to lock the $i^{th}$ set of digital signatures {$SIG_{i,1}, SIG_{i,2}, ..., SIG_{i,n}$} in the RFID tag 601 to the subset of digital signatures {$SIG_{i,a\_1}, SIG_{i,a\_2}, ..., SIG_{i,a\_k}$}. As a result, when a reading request as to the $i^{th}$ set of digital signatures {$SIG_{i,1}, SIG_{i,2}, ..., SIG_{i,n}$} is received in the future, only the subset of digital signatures {$SIG_{i,a\_1}, SIG_{i,a\_2}, ..., SIG_{i,a\_k}$} can be read, while other digital signatures in the $i^{th}$ set of digital signatures {$SIG_{i,1}, SIG_{i,2}, ..., SIG_{i,n}$} can not be read any more. Next, in step 905, the control means 705 determines whether the $i^{th}$ set of digital signatures in RFID tag 601 has been locked. If it has not been locked, no operation is performed and the process ends. If it has been locked, the process proceeds to step 906, where the subset of digital signatures {$SIG_{i,a\_1}, SIG_{i,a\_2}, ..., SIG_{i,a\_k}$} is sent to the RFID reader 602. In the second embodiment of the invention, the control means 705 performs the locking for example in the following manner: the control means 705 sets a corresponding flag bit $F_{i,j}$ with an initial value of 0 for each digital signature $SIG_{i,j}$, such that when $SIG_{i,j}$ is read for the first time, its corresponding flag bit $F_{i,j}$ is set to 1, and when the number of digital signatures in the $i^{th}$ set with a flag bit of 1 reaches k, the digital signatures in the $i^{th}$ set with a flag bit not being 1 can not be read any more. The manners for rendering the digital signatures unreadable include for example destroying them, e.g. resetting them to zeroes. The locking can be performed in other ways. For example there are no explicit flag bits in the tag and all the unreadable digital signatures are directly destroyed, e.g. reset to zeroes. Digital signatures all being zeroes may be judged by the tag as digital signatures that do not need to be sent to the reader, or they may be judged by the reader as digital signatures prohibited to be read in case of being sent by the tag. The effects are both causing the digital signatures unreadable to the reader. It is apparent to those skilled in the art that the locking operation can be carried out in other manners in software, hardware or the combination thereof. The present invention is not limited to the specific manners of locking illustrated herein as examples. Note that it is also possible that the RFID tag 601 receives a reading request which requests to read another number, e.g. k', of digital signatures of the $i^{th}$ set, however, no matter k' equals to k or not, the RFID tag 601 will permit at most k digital signatures of the $i^{th}$ set to be read. Furthermore, it is possible that the RFID tag 601 receives a reading request for reading the $i^{th}$ set of digital signatures and i>m. In this case, the control means 705 of the RFID tag 601 will judge the reading request as an erroneous request and will not respond to it.

Figure 10:
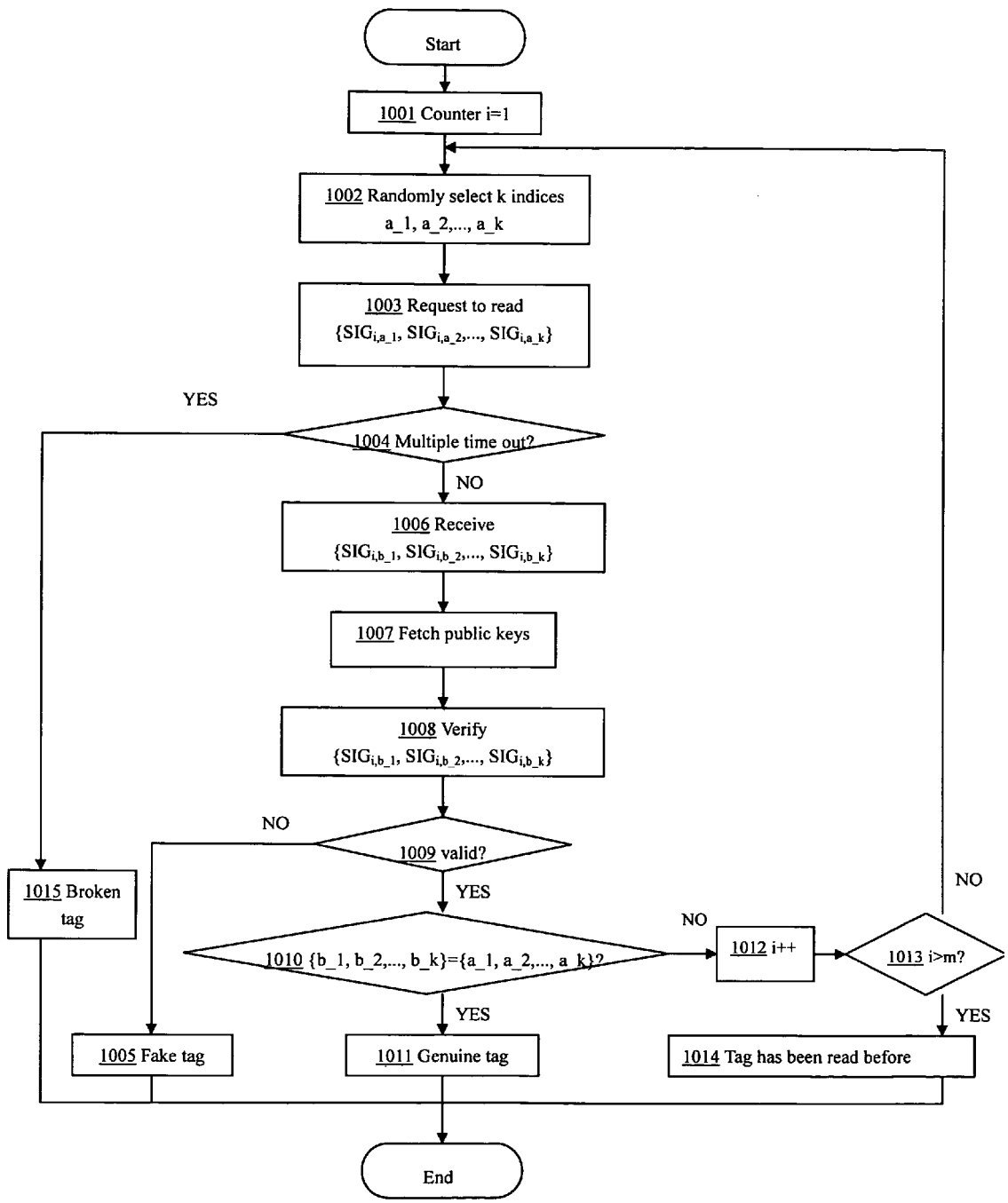
FIG. 10 is a flow chart showing the operations of the RFID reader 602 for sending the reading request to the RFID tag 601 and authenticating the RFID tag 601 based on the read digital signatures.

Corresponding to the operation flow of the RFID tag 601 shown in FIG. 9, FIG. 10 is a flow chart showing the operations of the RFID reader 602 for sending the reading request to the RFID tag 601 and authenticating the RFID tag 601 based on the data received from the RFID tag 601. It is assumed herein that the RFID reader 602 has successfully read the identification code, e.g. the EPC code, from the RFID tag 601, thus has determined an attribute uniquely identifying the RFID tag 601, and therefore has determined which public key or which set of public keys stored in the memory should be used to verify the read digital signatures. In step 1001, the value i of a counter (not shown) in the processor 801 of the RFID reader 602 is set to 1. Then in step 1002, the processor 801 randomly selects a subset of indices {$a\_1, a\_2, ..., a\_k$} from the set of indices {$1, 2, ..., n$}. Then in step 1003, the processor 801 controls the RFID reader 602 to send a reading request to the RFID tag 601 through the reader coupling element 803, requesting to read a subset of digital signatures {$SIG_{i,a\_1}, SIG_{i,a\_2}, ..., SIG_{i,a\_k}$} of the $i^{th}$ set of digital signatures, and starts to wait for the reply data from the RFID tag 601. In step 1004, the processor 801 determines whether it has been timed out for multiple times. If the answer is "YES", then in step 1005, the process proceeds to step 1015, where the authentication section 801-1 judges that the RFID tag 601 to be broken. The times of time out before the tag being judged as broken can be selected as needed. The manners of selecting are well known to those skilled in the art. If, in step 1004, a subset of digital signatures {$SIG_{i,b\_1}, SIG_{i,b\_2}, ..., SIG_{i,b\_k}$} sent from the RFID tag 601 was received before multiple times of time out are determined (step 1006), then in step 1007, the processor 801 fetches the public keys corresponding to the manufacturer from the memory 804. Next, in step 1008, the subset of digital signatures {$SIG_{i,b\_1}, SIG_{i,b\_2}, ..., SIG_{i,b\_k}$} is verified by using the public keys of the manufacturer. In step 1009, the validity of the subset of digital signatures {$SIG_{i,b\_1}, SIG_{i,b\_2}, ..., SIG_{i,b\_k}$} is judged. If it's invalid, then the authentication section 801-1 judges that the RFID tag 601 is a fake tag, thus the product being attached the RFID tag 601 is a fake product (step 1005). If it's valid, then in step 1010, it is determined whether the subset of indices {$b\_1, b\_2, ..., b\_k$} equals to the subset of indices {$a\_1, a\_2, ..., a\_k$} randomly selected in step 1001. If the answer is "YES", then the authentication section 801-1 judges that the RFID tag 601 is a genuine tag (step 1011). Otherwise, the processor increments the value i of the counter by 1 in step 1012, and determines whether i>m in step 1013. If i>m, then the authentication section 801-1 judges that the RFID tag 601 has been read before (step 1014), otherwise the process returns to step 1002 and step 1002 and subsequent flow are repeated. Through the above process, the RFID reader 602 can authenticate the RFID tag 601.

The advantage of adopting multiple sets of digital signatures is obvious. With m sets, it can be guaranteed that a real product will be authenticated as authentic by the reader for at least m times. This is useful because sometimes a product is bought as gift and may pass by several persons before it is consumed. In this scenario, not only the buyer or the final consumer, but also the intermediate persons may intend to authenticate the product. When m sets are stored on the tag, at least m persons will verify the product as authentic.

As an alternative to the second embodiment above, during the authentication, the RFID reader 602 may request to read a plurality of sets of digital signatures in the RFID tag 601 each time, and authenticate the tag based on the reading results for the plurality of sets of digital signatures. For example, the RFID reader 602 requests to read a subset of digital signatures $\{SIG_{1,a\_1}, SIG_{1,a\_2}, \ldots, SIG_{1,a\_k}\}$ of the $1^{st}$ set of digital signatures, and receives subsequently a subset of digital signatures $\{SIG_{1,b\_1}, SIG_{1,b\_2}, \ldots, SIG_{1,b\_k}\}$ returned from the tag; and then requests to read a subset of digital signatures $\{SIG_{2,a\_1}, SIG_{2,a\_2}, \ldots, SIG_{2,a\_k}\}$ of the $2^{nd}$ set of digital signatures, and receives subsequently a subset of digital signatures $\{SIG_{2,b\_1}, SIG_{2,b\_2}, \ldots, SIG_{2,b\_k}\}$ returned from the tag; and so on, until requests to read a subset of digital signatures $\{SIG_{t,a\_1}, SIG_{t,a\_2}, \ldots, SIG_{t,a\_k}\}$ of the $t^{th}$ set of digital signatures, and receives subsequently a subset of digital signatures $\{SIG_{t,b\_1}, SIG_{t,b\_2}, \ldots, SIG_{t,b\_k}\}$ returned from the tag. After receiving the t subsets of digital signature, the RFID reader 602 makes judgment as follows. If any digital signature of the returned t subsets of digital signatures is invalid, then it can be determined that the RFID tag 601 is broken; if all the digital signatures are valid, then if for any i satisfying $1 \leq i \leq t$, the subset of indices $\{b\_1, b\_2, \ldots, b\_k\}$ equals to the subset of indices $\{a\_1, a\_2, \ldots, a\_k\}$, the tag can be determined as a genuine tag; otherwise, it can be determined that the tag has been read before.

The advantage of the alternative scheme is that the probability that a fake product can be detected remarkably increases. Still, take k=1 as an example for computing the probability of detecting fake products. For one fake tag, the probability that t digital signatures in the t sets returned by it completely match the t digital signatures requested by the reader is $(1/n)^t$. Therefore, the fake tag will be detectable at probability $1-(1/n)^t$. Taking n=2 as example also, if t=12, one fake tag will be detectable at a probability of 99.97%.

Naturally, the detecting probability is increased at the cost of the decreasing of times that a tag can be authenticated as genuine. For example, assume that there are m=24 sets of digital signatures in a tag. If for each authentication, the reader will request to read one set of digital signatures, then the tag can be authenticated as authentic for at least 24 times. However, if for each authentication the reader requests to read 12 sets of digital signatures, then the tag can only be authenticated as authentic for at least 2 times.

A third embodiment of the invention is described below. The third embodiment is different from the first embodiment in that when the RFID reader sends the reading request to the RFID tag, it does not request a subset of digital signatures including multiple digital signatures at one time, but requests one digital signature each time. This embodiment realizes the tag-clone preventing effect equivalent to that of the first embodiment by locking, and further possesses the advantage of simpler implementation of the RFIG tag. This embodiment will be described with reference to FIGS. 11 to 15.

Figure 11:
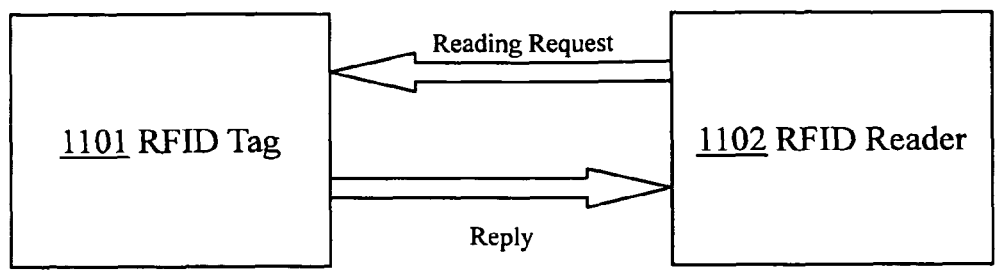
FIG. 11 shows an RFID system 1100 comprising an RFID tag 1101 and an RFID reader 1102 according to a third embodiment of the invention.

FIG. 11 shows an RFID system 1100 according to a third embodiment of the invention. As in the first embodiment, the RFID system 1100 comprises an RFID tag 1101 and an RFID reader 1102.

Figure 12:
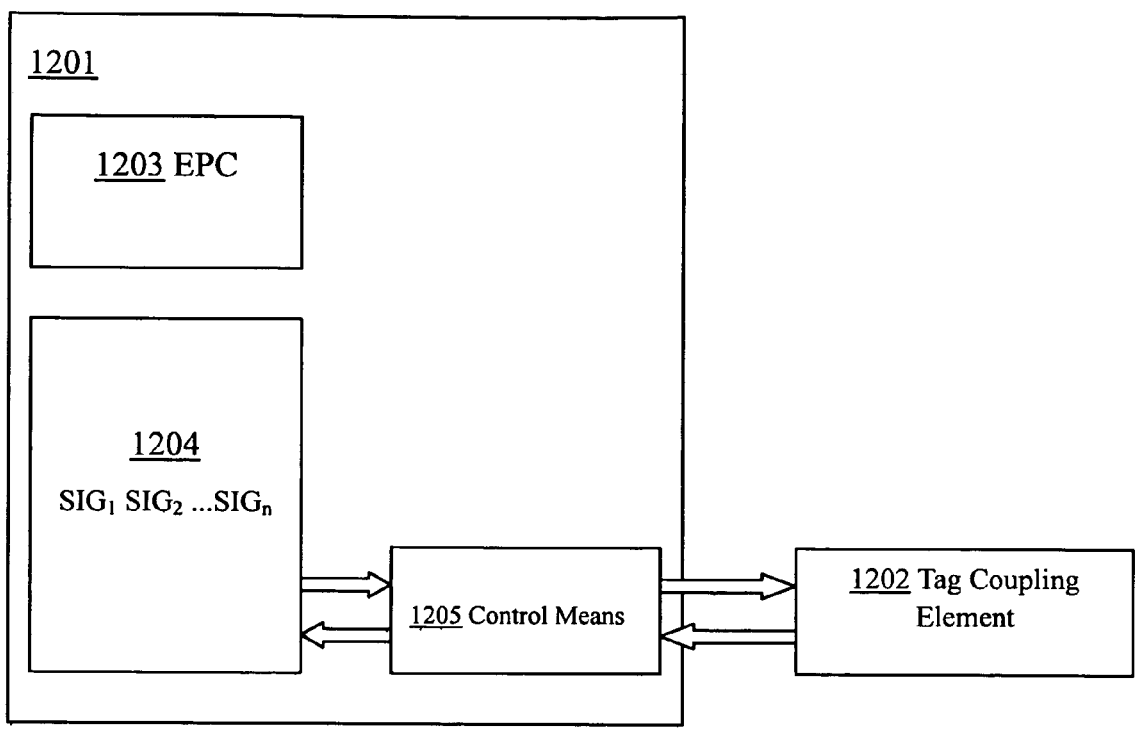
FIG. 12 is a schematic diagram showing the internal structure of the RFID tag 1101 according the third embodiment of the invention.

FIG. 12 is a schematic diagram showing the internal structure of the RFID tag 1101 shown in FIG. 11. As in the first embodiment, the RFID tag 1101 comprises a microchip 1201 and a tag coupling element 1202. The microchip 1201 includes an EPC code storage area 1203, a supplementary storage area 1204 and control means 1205.

Figure 13:
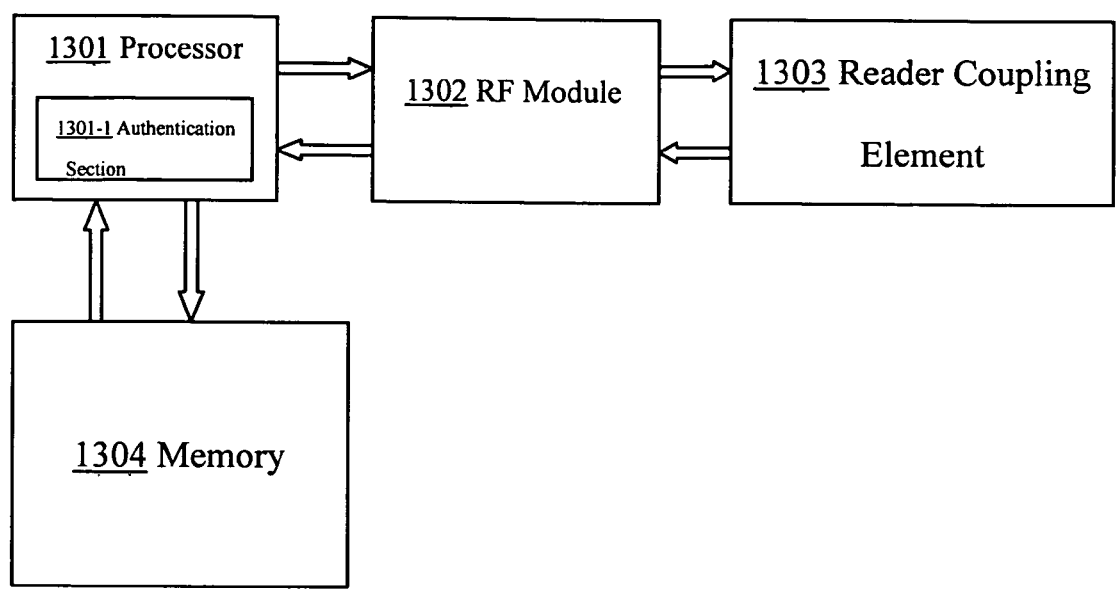
FIG. 13 is a schematic diagram showing the internal structure of the RFID reader 1102 according the third embodiment of the invention.

FIG. 13 is a schematic block diagram showing the internal structure of the RFID reader 1102 shown in FIG. 11. As in the first embodiment, the RFID reader 1102 comprises a processor 1301, a radio frequency module 1302, a reader coupling element 1303 and a memory 1304. The processor 1301 further comprises an authentication section 1301-1.

Figure 14:
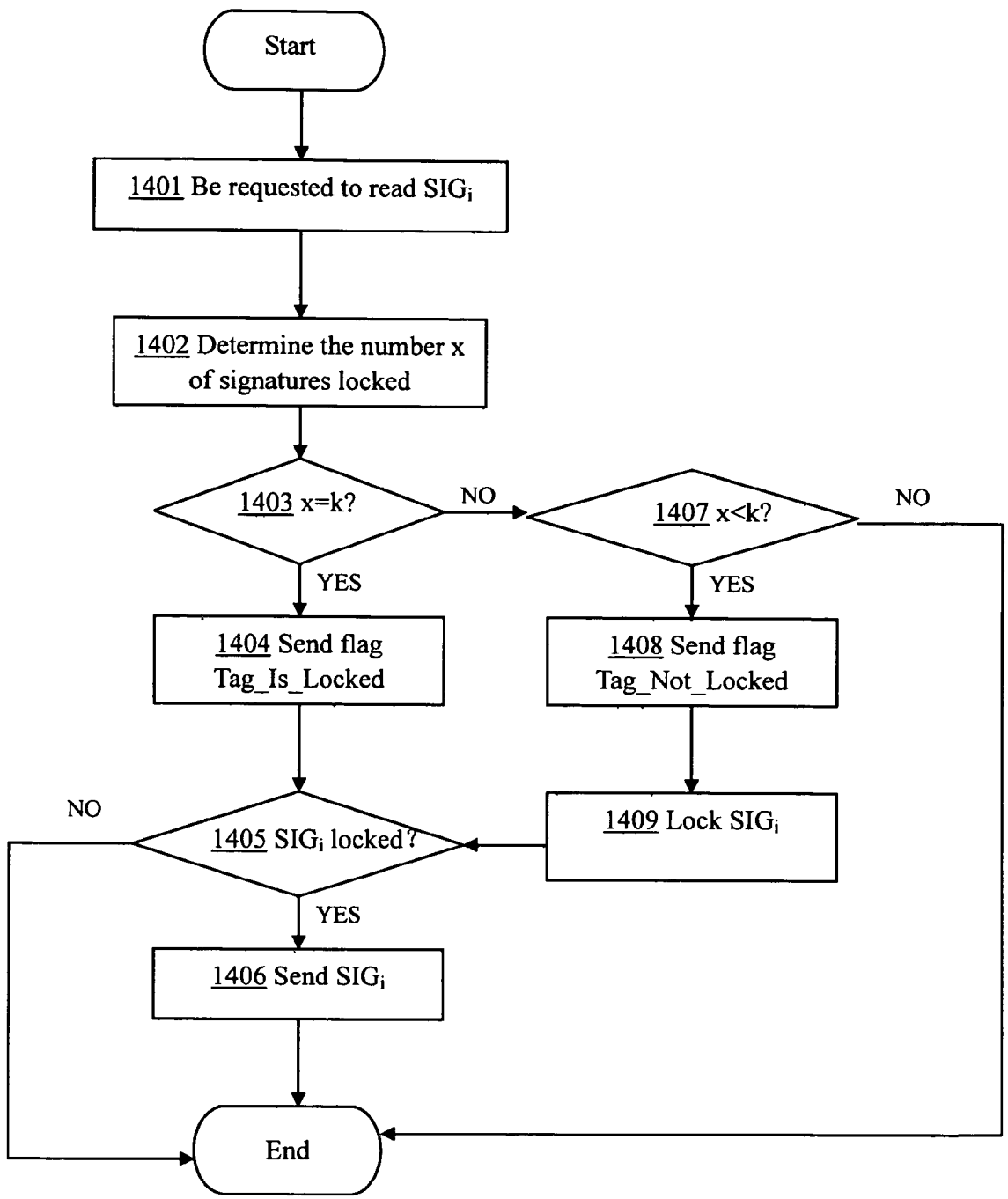
FIG. 14 is a flow chart showing the operations of the RFID tag 1101 upon receiving a reading request from the RFID reader 1102.

FIG. 14 is a flow chart showing the operations of the RFID tag 1101 shown in FIG. 11 upon receiving a reading request for digital signature $SIG_i$ from the RFID reader 1102. In this embodiment, as described above, it is assumed that there is a set of n (n>1) digital signatures $\{SIG_1, SIG_2, \ldots, SIG_n\}$ stored in the RFID tag 1101, and the RFID reader 1102 stores in its memory 1304 at least one public key corresponding to the manufacturer of the product associated with the RFID tag 1101 and sends reading requests to the RFID tag 1101 under the control of the processor 1301. It is further assumed that k digital signatures have to be read before the conclusion on the authenticity is drawn by the authentication section 1301-1. In step 1401, the RFID tag 1101 receives a reading request from the RFID reader 1102 which requests to read $SIG_i$. In step 1402, the control means 1205 of the RFID tag 1101 determines the number x of digital signatures that have been locked. Then in step 1403, the control means 1205 determines whether x equals to k. If the result is positive, i.e., x=k, then in step 1404, the RFID tag 1101 sends a flag Tag_Is_Locked to the RFID reader 1102 through the tag coupling element 1202, indicating that the tag has been locked. Next, in step 1405, the control means 1205 of the RFID tag 1101 determines whether $SIG_i$ has been locked. If it has been locked, then in step 1406, the RFID tag 1101 sends $SIG_i$ to the RFID reader 1102 through the tag coupling element 1202. The process ends and the RFID tag 1101 returns to the standby state, waiting for the next reading request from the RFID reader 1102. If it is determined in step 1405 that $SIG_i$ is not locked, then no operation is performed, the process ends and the RFID tag 1101 returns to the standby state. On the other hand, if in step 1403 the result by the control means 1205 is negative, i.e. x does not equal to k, then in step 1407, the control means 1205 determines whether x is less than k. If the result is negative, then no operation is performed and the RFID tag 1101 returns to the standby state. If the result is positive, then in step 1408, the RFID tag 1101 sends a flag Tag_Not_Locked to the RFID reader 1102 through the tag coupling element 1202, indicating that the tag has not been locked. Then in step 1409, the control means 1205 locks the $SIG_i$. In the third embodiment of the invention, the control means 1205 performs the locking for example in the following manner: the control means 1205 sets a corresponding flag bit $F_i$ with an initial value of 0 for each digital signature $SIG_i$, when each digital signature is read for the first time, its corresponding flag bit is set to 1, and when the number of digital signatures with a flag bit of 1 reaches k, the digital signatures with a flag bit other than 1 can not be read any more. The manners for rendering the digital signatures unreadable include for example destroying them, e.g. resetting them to zeroes. It is apparent to those skilled in the art that the locking operation can be carried out in other manners in software, hardware or the combination thereof. The present invention is not limited to the specific manners of locking illustrated herein as examples. When the $SIG_i$ is locked in step 1409, the process proceeds to step 1405 and the aforementioned flow from step 1405 till the end is carried out. At last, the RFID tag 1101 returns to the standby state, waiting for the next reading request from the RFID reader 1102. Note that it is also possible that the RFID tag 1101 receives reading requests which request to read another number, e.g. k', of digital signatures, however, no matter k' equals to k or not, the RFID tag 1101 will permit at most k digital signatures to be read.

Figure 15:
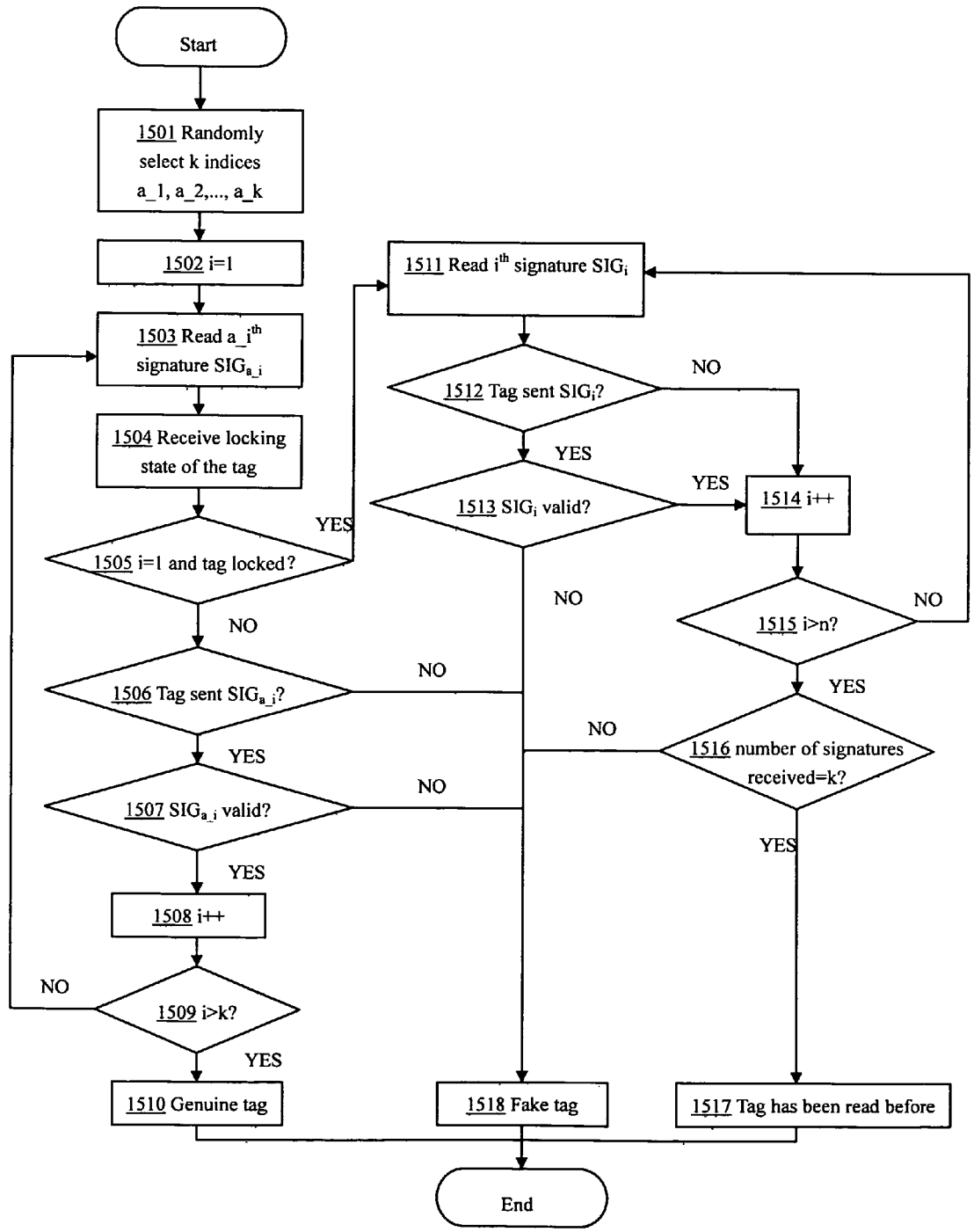
FIG. 15 is a flow chart showing the operations of the RFID reader 1102 for sending the reading request to the RFID tag 1101 and authenticating the RFID tag 1101 based on the read digital signatures.

Corresponding to the operation flow of the RFID tag 1101 shown in FIG. 14, FIG. 15 is a flow chart showing the operations of the RFID reader 1102 for sending the reading request to the RFID tag 1101 and authenticating the RFID tag 1101 based on the data received from the RFID tag 1101. It is assumed herein that the RFID reader 1102 has successfully read the identification code, e.g. the EPC code, from the RFID tag 1101, thus has determined an attribute uniquely identifying the RFID tag 1101, and therefore has determined which public key or public keys stored in the memory should be used to verify the read digital signatures. Firstly, in step 1501, the processor 1301 of the RFID reader 1102 randomly selects a subset of indices {a_1, a_2, . . . , a_k} including k indices. In step 1502, the processor 1301 sets the value i of a counter (not shown) included therein to 1, i.e. let i=1, where the value of i indicates the suffix into the subset of indices. Then in step 1503, the processor 1301 instructs the radio frequency module 1302 to generate a reading request that requests to read the a_$i^{th}$ signature $SIG_{a\_i}$, and sends that reading request to the RFID tag 1101 through the reader coupling element 1303. In step 1504, the RFID reader 1102 receives the flag on locking state from the RFID tag 1101. In step 1505, the processor 1301 determines whether i equals to 1 and determines whether the RFID tag 1101 has been locked based on the flag received. If i does not equal to 1 or the RFID tag 1101 has not been locked, then in step 1506, the processor 1301 determines whether the $SIG_{a\_i}$ sent from the RFID tag 1101 has been received. If it has been received, then in step 1507, the processor 1301 judges if $SIG_{a\_i}$ is valid. The manner herein for judging the validity is: the processor 1301 reads one or more public-keys determined in advance to belong to the manufacturer of the product associated with the RFID tag 1101, and verifies the digital signature with the one or more public-keys. If the digital signature is valid, then in step 1508, the value of i is incremented by 1, and in step 1509, the processor 1301 determines if i is greater than k. If i>k, then the process proceeds to step 1510, where the authentication section 1301-1 of the processor 1301 judges that the RFID tag 1101 is a genuine tag. If the result in step 1509 is i is not greater than k, then the process returns to step 1503 and the flow repeats. On the other hand, if the result in step 1506 or 1507 is negative, then in step 1518, the authentication section 1301-1 of the processor 1301 can determine that the RFID tag 1101 is a fake tag. On the other hand, if in step 1505, the result is positive, that is, i=1 and the tag has been locked, then in step 1511, the processor 1301 instructs the RFID reader 1102 to send a reading request for the $i^{th}$ signature $SIG_i$ through the reader coupling element 1303 to the RFID tag 1101. Next, in step 1512, it is determined whether the $SIG_i$ sent from the RFID tag 1101 is received. If it is received, then in step 1513, the processor 1301 judges whether the $SIG_i$ is valid. The manner for judging the validity is the same as the one mentioned above. If it is invalid, then the process proceeds to step 1518, the authentication section 1301-1 judges that the RFID tag 1101 is a fake tag. If it is determined that the $SIG_i$ is valid in step 1513, then in step 1514, the processor 1301 increments the value of i by 1. On the other hand, if the $SIG_i$ is not received in step 1512, the process also proceeds to step 1514, where the processor 1301 increments the value of i by 1. Then in step 1515, the processor 1301 determines whether i is greater than n. If i is not greater than n, then the process returns to step 1511, and the steps are repeated under the condition that i has been incremented by 1. If i>n, then in step 1516, the processor 1301 determines whether the number of signatures received equals to k. If the answer is "YES", then in step 1517, the authentication section 1301-1 judges that the RFID tag 1101 has been read before. Otherwise, it can be determined that the RFID tag 1101 is a fake tag and the process proceeds to step 1518. In step 1510, step 1518 or step 1517, the authentication process ends after the authentication section 1301-1 makes judgment as to the authenticity of the RFID tag 1101.

Figure 16:
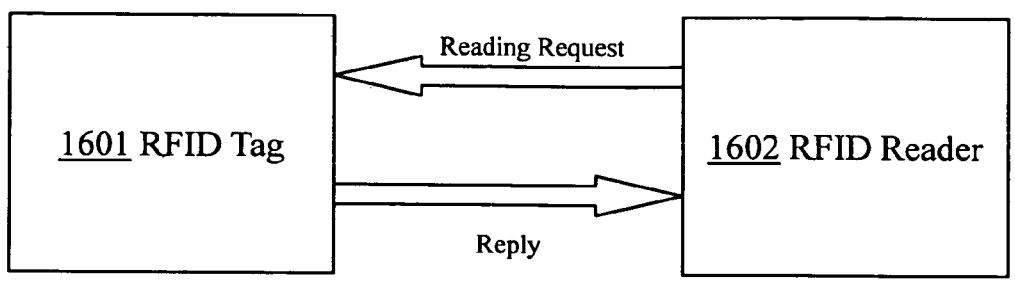
FIG. 16 shows an RFID system 1600 comprising an RFID tag 1601 and an RFID reader 1602 according to a forth embodiment of the invention.

FIG. 16 shows an RFID system 1600 according to a forth embodiment of the invention. As in the second embodiment, the RFID system 1600 comprises an RFID tag 1601 and an RFID reader 1602.

Figure 17:
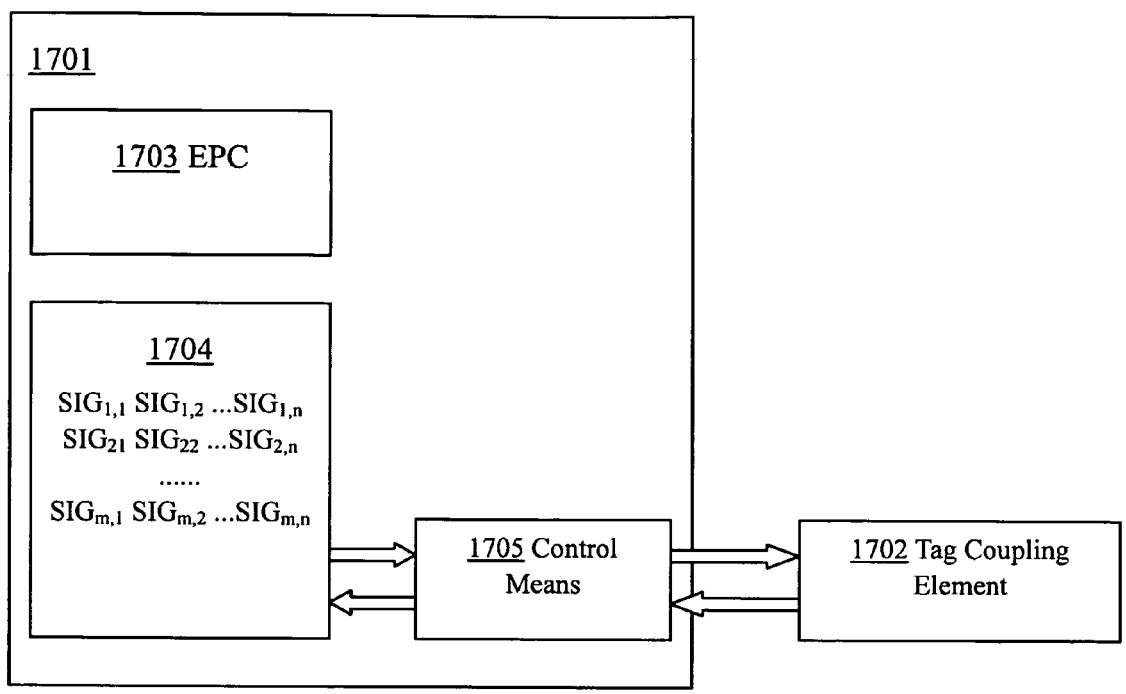
FIG. 17 is a schematic diagram showing the internal structure of the RFID tag 1601 according the forth embodiment of the invention.

FIG. 17 is a schematic diagram showing the internal structure of the RFID tag 1601 shown in FIG. 16. As in the second embodiment, the RFID tag 1601 comprises a microchip 1701 and a tag coupling element 1702. The microchip 1701 includes an EPC code storage area 1703, a supplementary storage area 1704 and control means 1705.

Figure 18:
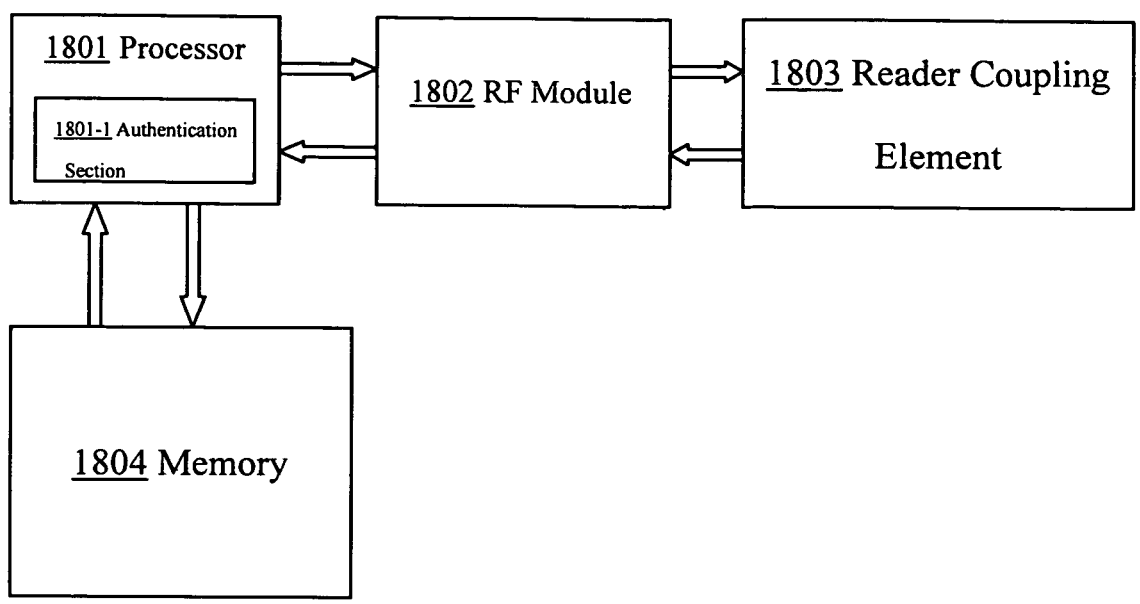
FIG. 18 is a schematic diagram showing the internal structure of the RFID reader 1602 according the forth embodiment of the invention.

FIG. 18 is a schematic block diagram showing the internal structure of the RFID reader 1602 shown in FIG. 61. As in the second embodiment, the RFID reader 1602 comprises a processor 1801, a radio frequency module 1802, a reader coupling element 1803 and a memory 1804. The processor 1801 further comprises an authentication section 1801-1.

Figure 19:
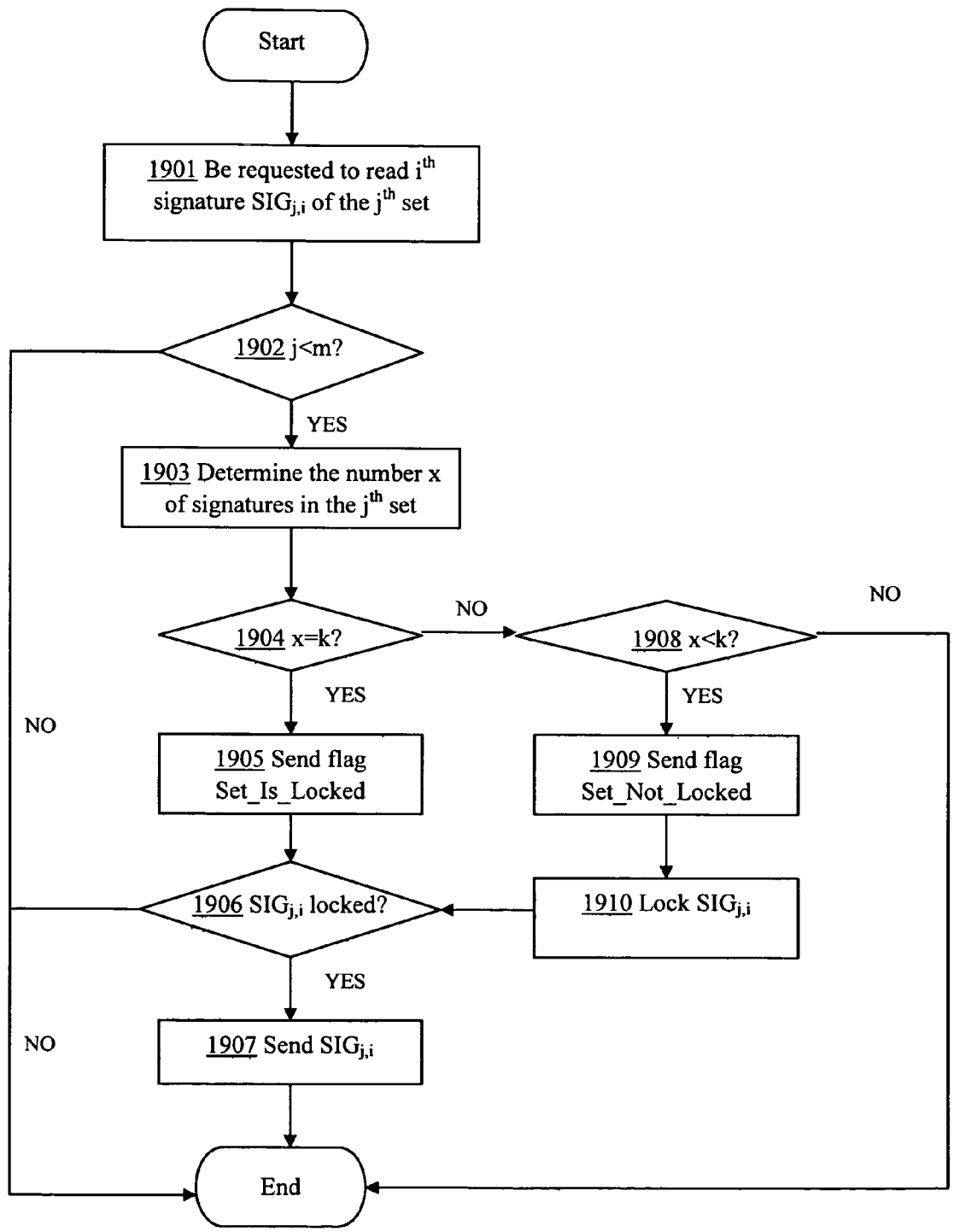
FIG. 19 is a flow chart showing the operations of the RFID tag 1601 upon receiving a reading request from the RFID reader 1602.

FIG. 19 is a flow chart showing the operations of the RFID tag 1601 shown in FIG. 16 upon receiving a reading request for digital signature $SIG_{j,i}$ from the RFID reader 1602. In this embodiment, as described above, it is assumed that there are m sets of n (n>1) digital signatures stored in the RFID tag 1601, which form a matrix of digital signatures $\{SIG_{j,i}\}$, $1 \leq j \leq m$, $1 \leq i \leq n$. In step 1901, the RFID tag 1601 receives a reading request from the RFID reader 1602 which requests to read $SIG_{j,i}$. In step 1902, the control means 1705 of the RFID tag 1601 determines whether j is less than m. If the result is negative, then no operation is performed and the RFID 1601 returns to the standby state. If in step 1902 the result is positive, i.e., j<m, then in step 1903, the control means 1705 determines the number x of digital signatures that have been locked. Then in step 1904, the control means 1705 determines whether x equals to k. If the result is positive, i.e., x=k, then in step 1905, the RFID tag 1601 sends a flag Set_Is_Locked to the RFID reader 1602 through the tag coupling element 1702, indicating that the $j^{th}$ set has been locked. Next, in step 1906, the control means 1705 of the RFID tag 1601 determines whether $SIG_{j,i}$ has been locked. If it has been locked, then in step 1907, the RFID tag 1601 sends $SIG_{j,i}$ to the RFID reader 1602 through the tag coupling element 1702. The process ends and the RFID tag 1601 returns to the standby state, waiting for the next reading request from the RFID reader 1602. If it is determined in step 1906 that $SIG_{j,i}$ is not locked, then no operation is performed, the process ends and the RFID tag 1601 returns to the standby state. On the other hand, if in step 1904 the result by the control means 1705 is negative, i.e. x does not equal to k, then in step 1908, the control means 1705 determines whether x is less than k. If the result is negative, then no operation is performed and the RFID tag 1601 returns to the standby state. If the result is positive, then in step 1909, the RFID tag 1601 sends a flag Set_Not_Locked to the RFID reader 1602 through the tag coupling element 1702, indicating that the $j^{th}$ set has not been locked. Then in step 1910, the control means 1705 locks the $SIG_{j,i}$. In one embodiment of the invention, the control means 1705 performs the locking for example in the following manner: the control means 1705 sets a corresponding flag bit $F_{j,i}$ with an initial value of 0 for each digital signature $SIG_{j,i}$, and when each digital signature is read for the first time, its corresponding flag bit is set to 1, and when the number of digital signatures with a flag bit of 1 in a set reaches k, the digital signatures with a flag bit other than 1 in that set can not be read any more. The manners for rendering the digital signatures unreadable include for example destroying them, e.g. resetting them to zeroes. It is apparent to those skilled in the art that the locking operation can be carried out in other manners in software, hardware or the combination thereof. The present invention is not limited to the specific manners of locking illustrated herein as examples. When the $SIG_{j,i}$ is locked in step 1910, the process proceeds to step 1906 and the aforementioned flow from step 1906 till the end is carried out. At last, the RFID tag 1601 returns to the standby state, waiting for the next reading request from the RFID reader 1602. Note that it is also possible that the RFID tag 1601 receives reading requests which request to read another number, e.g. k', of digital signatures of the $j^{th}$ set, however, no matter k' equals to k or not, the RFID tag 1601 will permit at most k digital signatures of the $j^{th}$ set to be read. Furthermore, it is possible that the RFID tag 1601 receives a reading request for reading the $j^{th}$ set of digital signatures and j>m. In this case, the control means 1705 of the RFID tag 1601 will judge the reading request as an erroneous request and will not respond to it.

Figure 20:
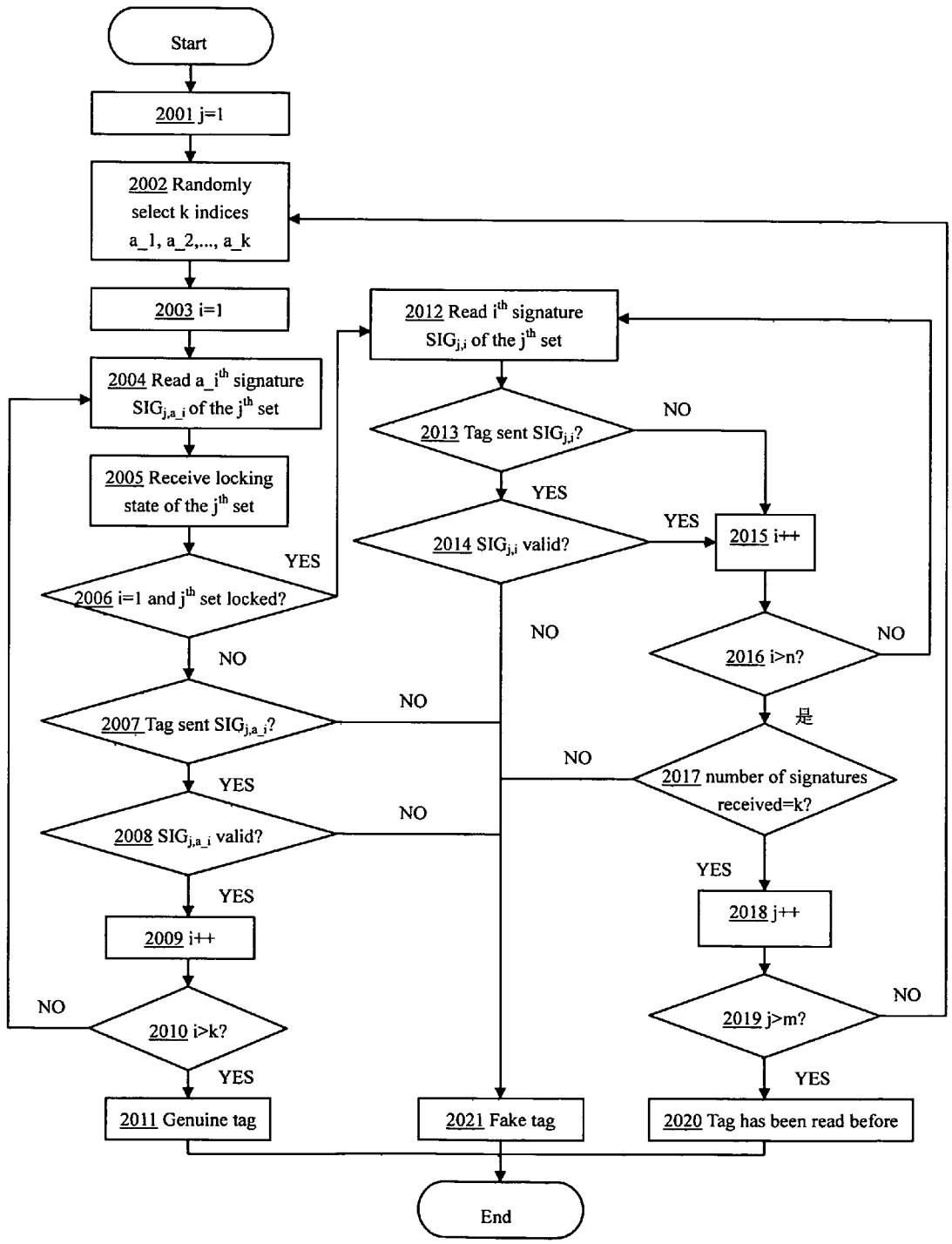
FIG. 20 is a flow chart showing the operations of the RFID reader 1602 for sending the reading request to the RFID tag 1601 and authenticating the RFID tag 1601 based on the read digital signatures.

Corresponding to the operation flow of the RFID tag 1601 shown in FIG. 19, FIG. 20 is a flow chart showing the operations of the RFID reader 1602 for sending the reading request to the RFID tag 1601 and authenticating the RFID tag 1601 based on the data received from the RFID tag 1601. It is assumed herein that the RFID reader 1602 has successfully read the identification code, e.g. the EPC code, from the RFID tag 1601, thus has determined an attribute uniquely identifying the RFID tag 1601, and therefore has determined which public key or public keys stored in the memory should be used to verify the read digital signatures. In step 2001, the processor 1801 of the RFID reader 1602 sets the value j of a first counter (not shown) included therein as 1, i.e. let j=1, where the value of j indicates the suffix of a set. Next, in step 2002, the processor 1801 randomly selects a subset of indices {a_1, a_2, . . . , a_k} including k indices. In step 2003, the processor 1801 sets the value i of a second counter (not shown) included therein to 1, i.e. let i=1, where the value of i indicates the suffix into the subset of indices. Then in step 2004, the processor 1801 instructs the radio frequency module 1802 to generate a reading request that requests to read the $a\_i^{th}$ signature $SIG_{j,a\_i}$ of the $j^{th}$ set, and sends that reading request to the RFID tag 1601 through the reader coupling element 1803. In step 2005, the RFID reader 1602 receives the flag on locking state from the RFID tag 1601. In step 2006, the processor 1801 determines whether i equals to 1 and determines whether the $j^{th}$ set of digital signatures of RFID tag 1601 has been locked based on the flag received. If i does not equal to 1 or the $j^{th}$ set has not been locked, then in step 2007, the processor 1801 determines whether the $SIG_{j,a\_i}$ sent from the RFID tag 1601 has been received. If it has been received, then in step 2008, the processor 1801 judges if $SIG_{j,a\_i}$ is valid. The manner herein for judging the validity is: the processor 1801 reads one or more public-keys determined in advance to belong to the manufacturer of the product associated with the RFID tag 1601, and verifies the digital signature with the one or more public-keys. If the digital signature is valid, then in step 2009, the value i of the second counter is incremented by 1, and in step 2010, the processor 1801 determines if i is greater than k. If i>k, then the process proceeds to step 2011, where the authentication section 1801-1 of the processor 1801 judges that the RFID tag 1601 is a genuine tag. If the result in step 2010 is that i is not greater than k, then the process returns to step 2004 and the flow repeats. On the other hand, if the result in step 2007 or 2008 is negative, then the authentication section 1801-1 can determine that the RFID tag 1601 is a fake tag (step 2021). On the other hand, if in step 2006, the result is positive, that is, i=1 and the $j^{th}$ set has been locked, then in step 2012, the processor 1801 instructs the RFID reader 1602 to send a reading request for the $i^{th}$ signature $SIG_{j,i}$ of the $j^{th}$ set through the reader coupling element 1803 to the RFID tag 1601. Next, in step 2013, it is determined whether the $SIG_{j,i}$ sent from the RFID tag 1601 is received. If it is received, then in step 2014, the processor 1801 judges whether the $SIG_{j,i}$ is valid. The manner for judging the validity is the same as the one mentioned above. If it is invalid, then the authentication section 1801-1 judges that the RFID tag 1601 is a fake tag. If it is determined that the $SIG_{j,i}$ is valid in step 2014, then in step 2015, the processor 1801 increments the value of i by 1. On the other hand, if the $SIG_{j,i}$ is not received in step 2013, the process also proceeds to step 2015, where the processor 1801 increments the value i of the second counter by 1. Then in step 2016, the processor 1801 determines whether i is greater than n. If i is not greater than n, then the process returns to step 2012, and the step and the subsequent steps are repeated under the condition that i has been incremented by 1. If i>n, then in step 2017, the processor 1801 determines whether the number of signatures received equals to k. If the answer is "NO", then the authentication section 1801-1 judges that the RFID tag 1601 is a fake tag (step 2021). If the answer is "YES", that is, the number of signatures received equals to k, then the processor 1801 increments the value j of the first counter by 1 in step 2018 and determines whether j is greater than m in step 2019. If it is determined that j>m, then the authentication section 1801-1 judges that the RFID tag 1601 has been read before (step 2020). Otherwise, the process returns to step 2002 and step 2002 and the subsequent steps are repeated under the condition that the value of j has been incremented by 1. In step 2011, step 2021 or step 2020, the authentication process ends after the authentication section 1801-1 makes judgment as to the authenticity of the RFID tag 1601.

In the above embodiments, the verifiable data are digital signatures. However, it is apparent to those skilled in the art that, for other forms of verifiable data, the technical effects of having the genuine tags pass the authentication while preventing them from being cloned can also be achieved through the "locking" function as proposed by the invention. And the technical solutions of the invention can be readily implemented using various forms of verifiable data by those skilled in the art upon reading the description.

The embodiments for an RFID system authenticating a product and a product authentication using the RFID system according to the present invention are described above. As has been pointed out, with the preferred digital signature scheme, e.g. ECDSA and SHA-1, one signature takes 320 bits of the supplementary storage area. So twelve digital signatures need 3840 bits of the supplementary storage area. If the tag memory consumption could be reduced, the cost of the tag could be reduced accordingly. The fact that high volume products require high volume tags immediately confirms the importance of reducing the cost of tag for even only one cent.

Figure 21:
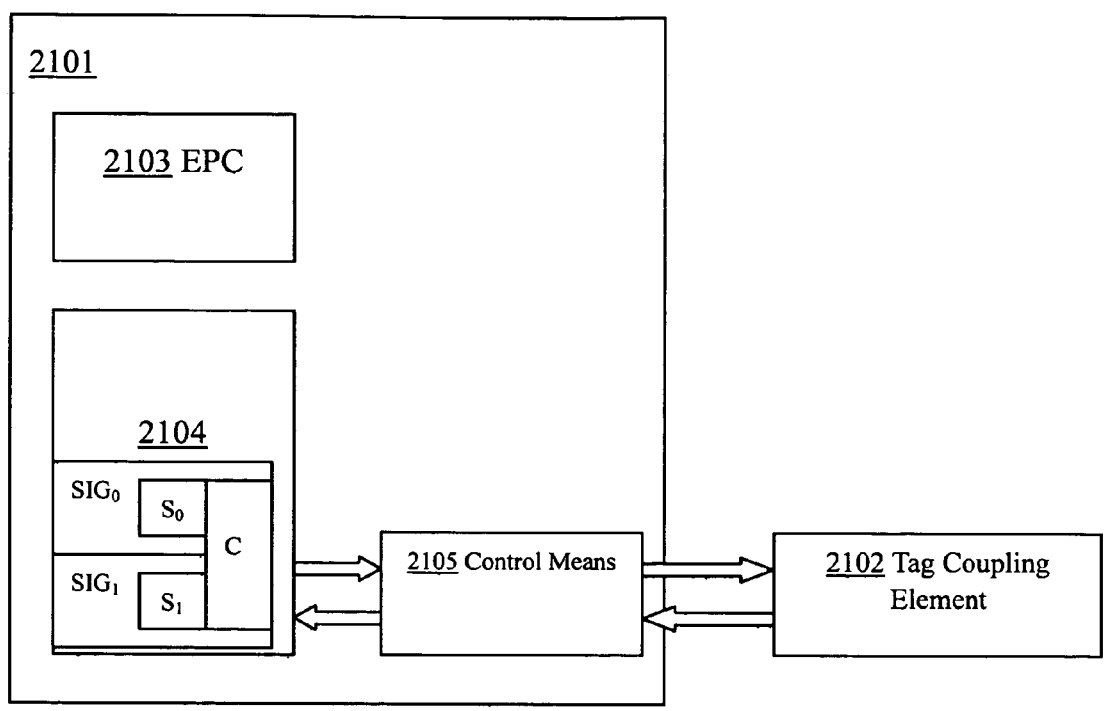
FIG. 21 shows the reduction of the memory cost of an RFID tag according to a fifth embodiment of the invention.

In a fifth embodiment of the invention, there is provided a method that can further reduce the RFID tag memory consumption for storing the signatures. FIG. 21 is a diagram showing the internal structure of an RFID tag 2100 obtained by computing the digital signatures through the improved method. The RFID tag comprises a microchip 2101 and a tag coupling element 2102. The microchip 2101 includes an identification code storage area 2103, a supplementary storage area 2104 and control means 2105. There are a set of n digital signatures $\{SIG_1, SIG_2, \ldots, SIG_n\}$ stored in the supplementary storage area 2104. For simplicity only 2 digital signatures are illustrated in the figure. Each digital signature $SIG_i$ in the set of digital signatures $\{SIG_1, SIG_2, \ldots, SIG_n\}$ takes a form of $(S_i, C)$, including a portion $S_i$ and a portion C, i=1, ..., n, and wherein each digital signature is computed and verified as follows:

selecting a group (further described later) G of order v; selecting a subgroup of order u of said group G, where u≦v; selecting n private keys x1, x2, ..., xn based on said order u, where 1<|xi|<u, i=1, ..., n; selecting an element g of group G as the generator; selecting n integers r1, r2, ..., rn as indicators within said order u, where 0<|ri|<u, i=1, ..., n; selecting a random integer r within said order u, where 0<|r|<u, and computing $C=H(M, g^{r*r1*r2* \cdots *rn})$ where H is secure hashing function, and M represents the identification code and other information; computing $S_i = r*(r1*r2* \ldots *rn)/ri - C*xi$; releasing $(S_1, C), (S_2, C), \ldots, (S_n, C)$ as n digital signatures on the same message M; computing public keys $y_i = (g^{ri}, g^{ri*xi})$ based on said private key, said generator and said indicator; and based on public-key $y_i$, verifying whether $SIG_i = (S_i, C)$ is valid signature on the message M by computing $C' = H(M, (g^{ri})^{si} * (g^{ri*xi})^C)$, and If C'=C, $SIG_i$ is a valid digital signature on message M; otherwise, $SIG_i$ is invalid, or selecting a group G of order v; selecting a subgroup of order u of said group G, where u≦v; selecting n private keys x1, x2, ..., xn based on said order u, where 1<|xi|<u, i=1, ..., n; selecting an element g of group G as the generator; selecting n integers r1, r2, ..., rn as indicators within said order u, where 0<|ri|<u, i=1, ..., n; selecting a random integer r within said order u, where 0<|r|<u, and computing $C=H(M, g^{r*r1*r2* \cdots *rn})$ where H is secure hashing function, and M represents the identification code and other information; computing $S_i = r*(r1*r2* \ldots *rn)/(r1*r2* \ldots * ri) - C*xi$; releasing $(S_1, C), (S_2, C), \ldots, (S_n, C)$ as n digital signatures on the same message M; computing public keys $y_i = (g^{r1*r2* \cdots *ri}, g^{r1*r2* \cdots *ri*xi})$ based on said private key, said generator and said indicator; and based on public-key $y_i$, verifying whether $SIG_i = (S_i, C)$ is valid signature on the message M by computing $C' = H(M, (g^{r1*r2* \cdots *ri})^{si} * (g^{r1*r2* \cdots ri*xi})^C)$, and If C'=C, $SIG_i$ is a valid digital signature on message M; otherwise, $SIG_i$ is invalid.

Throughout the specification and the claims, the term "group" refers to the mathematics concept defined as follows unless otherwise indicated:

a group (G, ◇) consists of a set G with a binary operation ◇ on G satisfying the following three axioms:

(i) the group operation is associative. That is, a ◇ (b ◇ c) = (a ◇ b) ◇ c for all elements a, b, c of G;

(ii) there is an identity element e of G such that a ◇ e = e ◇ a = a for all elements a of G; and (iii) for each element a of G there exists an element a−1 of G, called the inverse of a, such that a ◇ a−1 = a− ◇ a = e.

For example, the set of integers Z with operation of addition forms a group. The identity element is 0 and the inverse of an integer a is the integer −a. For more information, please refer to Handbook of Applied Cryptography, available online at http://www.cacr.math.uwaterloo.ca/hac/.

Note that there are many candidates of secure hashing algorithm such as MD5 and SHA-1, and additional information may be incorporated in hashing. Also note that other equations for compute $S_i$ are available and applicable as has been published in "Meta-ElGamal signature schemes, Proc. 2nd ACM conference on Computer and Communications security, pp. 96-107, 1994". All these are known to those skilled in the art The advantage of the method of this embodiment is obvious. When using 160 bit elliptic curve and SHA-1, since a common C is shared by all the signatures, twelve signatures now need only 2080 bits of tag memory while before applying this approach 3840 bits are required. If the size of C is slightly reduced to 128 bits, which do not jeopardize the security level, 2 k bits of tag memory is exactly sufficient for twelve signatures to be stored.

Generally, for n>1 signatures stored in the tag, they can share one C. The product manufacturer now needs n public keys. Note that in the preferred case, i.e., when x1=x2=...=xn=x, the public keys are generated following the principle disclosed in the anonymous public-key patent application (Chinese patent application 200410090903.X) of the applicant.

It's easy to verify that compared with previous approach that does not share C, the RFID tag supplementary storage area saving is (n−1)/2n. For example, n=12, there is 45.8% off on the supplementary storage area of the RFID tag.

It's notable that when signature sets are utilized, all the signatures can share one C regardless they are in same set or not. The set is indeed logic partition not physical.

It can be seen from the above that, according to the embodiments of the invention, a "locking" function is introduced into the RFID tag. As the consequence, cloning of inexpensive tag is prohibited and mass counterfeits are thwarted based on multiple digital signatures stored on the RFID tag and the "locking" function carried out by the RFID tag.

In addition, multiple signatures are divided into sets and stored in the RFID tag. By introducing signature sets, it's guaranteed that a genuine tag could be verified as authentic for at least m times, where m is the number of signature sets.

In addition, RFID tag memory consumption for storage of the multiple signatures is largely reduced by the public key and signature generation method sharing one portion C.

Although the invention has been described with reference to the particular preferred embodiments, it is to be understood by those skilled in the art that various modifications as to forms and details can be made therewith without departing from the spirit and scope of the invention as defined by the appended claims.

The invention claimed is:

1. A radio frequency identification system comprising:
a radio frequency identification tag having an identification code and a set of verifiable data stored therein; and
a radio frequency identification reader which sends a reading request to the radio frequency identification tag, requesting to read a first portion of the set of verifiable data,
wherein the radio frequency identification tag further comprises a controller, which, if the radio frequency identification tag receives the reading request from the radio frequency identification reader, and if a locking operation has not been performed on a second portion of the set of verifiable data, then the controller controls the locking operation to be performed on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein $k=n*0.5$ if n is even; and $k=n*0.5+0.5$ or $k=n*0.5-0.5$ if n is odd.

2. A radio frequency identification system comprising:

a radio frequency identification tag having an identification code and a set of verifiable data stored therein; and a radio frequency identification reader which sends a reading request to the radio frequency identification tag, requesting to read a first portion of the set of verifiable data, wherein the radio frequency identification tag further comprises a controller, which, if the radio frequency identification tag receives the reading request from the radio frequency identification reader, and if a locking operation has not been performed on a second portion of the set of verifiable data, then the controller controls the locking operation to be performed on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein each digital signature $SIG_i$ of the n digital signatures $SIG_1, SIG_2, \ldots, SIG_n$ takes a form of $(S_i, C)$, including a portion $S_i$ and a portion $C$, $i=1, \ldots, n$, and all digital signatures of the n digital signatures share one common portion C.

3. The radio frequency identification system according to claim 2, wherein each digital signature of the n digital signatures $SIG_1, SIG_2, \ldots, SIG_n$ is computed and verified as follows:

selecting a group G of order v;

selecting a subgroup of order u of said group G, where $u \leq v$;

selecting n private keys $x1, x2, \ldots, xn$ based on said order u, where $1<|xi|<u$, $i=1, \ldots, n$;

selecting an element g of group G as the generator;

selecting n integers $r1, r2, \ldots, rn$ as indicators within said order u, where $0<|ri|<u$, $i=1, \ldots, n$;

selecting a random integer r within said order u, where $0<|r|<u$, and computing $C=H(M, g^{r*r1*r2*\cdots*rn})$ where H is secure hashing function, and M represents the identification code and other information;

computing $S_i = r*(r1*r2* \ldots *rn)/ri - C*xi$;

releasing $(S_1, C), (S_2, C), \ldots, (S_n, C)$ as n digital signatures on the same message M;

computing public keys $y_i = (g^{ri}, g^{ri*xi})$ based on said private key, said generator and said indicator;

based on public-key $y_i$, verifying whether $SIG_i = (S_i, C)$ is valid signature on the message M by computing $C' = H(M, (g^{ri})^{si} * (g^{ri*xi})^C)$, and If $C' = C$, $SIG_i$ is a valid digital signature on message M; otherwise, $SIG_i$ is invalid.

4. The radio frequency identification system according to claim 2, wherein each digital signature of the n digital signatures $SIG_1, SIG_2, \ldots, SIG_n$ is computed and verified as follows:

selecting a group G of order v;

selecting a subgroup of order u of said group G, where $u \leq v$;

selecting n private keys $x1, x2, \ldots, xn$ based on said order u, where $1<|xi|<u$, $i=1, \ldots, n$;

selecting an element g of group G as the generator;

selecting n integers $r1, r2, \ldots, rn$ as indicators within said order u, where $0<|ri|<u$, $i=1, \ldots, n$;

selecting a random integer r within said order u, where $0<|r|<u$, and computing $C=H(M, g^{r*r1*r2*\cdots*rn})$ where H is secure hashing function, and M represents the identification code and other information;

computing $S_i = r*(r1*r2* \ldots *rn)/(r1*r2* \ldots *ri) - C*xi$;

releasing $(S_1, C), (S_2, C), \ldots, (S_n, C)$ as n digital signatures on the same message M;

computing public keys $y_i = (g^{r1*r2*\cdots*ri}, g^{r1*r2*\cdots*ri*xi})$ based on said private key, said generator and said indicator;

based on public-key $y_i$, verifying whether $SIG_i = (S_i, C)$ is valid signature on the message M by computing $C' = H(M, (g^{r1*r2*\cdots*ri})^{si} * (g^{r1*r2*\cdots*ri*xi})^C)$, and If $C' = C$, $SIG_i$ is a valid digital signature on message M; otherwise, $SIG_i$ is invalid.

5. A radio frequency identification tag having an identification code and a set of verifiable data stored therein, wherein the radio frequency identification tag further comprises a controller, which, if the radio frequency identification tag receives a reading request that requests to read a first portion of the set of verifiable data, and if a locking operation has not been performed on a second portion of the set of verifiable data, then the controller controls the locking operation to be performed on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein $k=n*0.5$ if n is even; and $k=n*0.5+0.5$ or $k=n*0.5-0.5$ if n is odd.

6. A radio frequency identification tag having an identification code and a set of verifiable data stored therein, wherein the radio frequency identification tag further comprises a controller, which, if the radio frequency identification tag receives a reading request that requests to read a first portion of the set of verifiable data, and if a locking operation has not been performed on a second portion of the set of verifiable data, then the controller controls the locking operation to be performed on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein each digital signature $SIG_i$ of the n digital signatures $SIG_1, SIG_2, \ldots, SIG_n$ takes a form of $(S_i, C)$, including a portion $S_i$ and a portion C, i=1, ..., n, and all digital signatures of the n digital signatures share one common portion C.

7. The radio frequency identification tag according to claim 6, wherein each digital signature of the n digital signatures $SIG_1, SIG_2, \ldots, SIG_n$ is computed and verified as follows:

selecting a group G of order v;

selecting a subgroup of order u of said group G, where $u \leq v$;

selecting n private keys x1, x2, ..., xn based on said order u, where $1 < |xi| < u$, i=1, ..., n;

selecting an element g of group G as the generator;

selecting n integers r1, r2, ..., rn as indicators within said order u, where $0 < |ri| < u$, i=1, ..., n;

selecting a random integer r within said order u, where $0 < |r| < u$, and computing $C = H(M, g^{r*r1*r2* \cdots *rn})$ where H is secure hashing function, and M represents the identification code and other information;

computing $S_i = r*(r1*r2* \cdots *rn)/ri - C*xi$;

releasing $(S_1, C), (S_2, C), \ldots, (S_n, C)$ as n digital signatures on the same message M;

computing public keys $y_i = (g^{ri}, g^{ri*xi})$ based on said private key, said generator and said indicator;

based on public-key $y_i$, verifying whether $SIG_i = (S_i, C)$ is valid signature on the message M by computing $C' = H(M, (g^{ri})^{si} * (g^{ri*xi})^C)$, and If $C' = C$, $SIG_i$ is a valid digital signature on message M; otherwise, $SIG_i$ is invalid.

8. The radio frequency identification tag according to claim 6, wherein each digital signature of the n digital signatures $SIG_1, SIG_2, \ldots, SIG_n$ is computed and verified as follows:

selecting a group G of order v;

selecting a subgroup of order u of said group G, where $u \leq v$;

selecting n private keys x1, x2, ..., xn based on said order u, where $1 < |xi| < u$, i=1, ..., n;

selecting an element g of group G as the generator;

selecting n integers r1, r2, ..., rn as indicators within said order u, where $0 < |ri| < u$, i=1, ..., n;

selecting a random integer r within said order u, where $0 < |r| < u$, and computing $C = H(M, g^{r*r1*r2* \cdots *rn})$ where H is secure hashing function, and M represents the identification code and other information;

computing $S_i = r*(r1*r2* \cdots *rn)/(r1*r2* \cdots *ri) - C*xi$;

releasing $(S_1, C), (S_2, C), \ldots, (S_n, C)$ as n digital signatures on the same message M;

computing public keys $y_i (g^{r1*r2* \cdots *ri}, g^{r1*r2* \cdots *ri*xi})$ based on said private key, said generator and said indicator;

based on public-key $y_i$, verifying whether $SIG_i = (S_i, C)$ is valid signature on the message M by computing $C' = H(M, (g^{r1*r2* \cdots *ri})^{si} * (g^{r1*r2* \cdots *ri*xi})^C)$, and If $C' = C$, $SIG_i$ is a valid digital signature on message M; otherwise, $SIG_i$ is invalid.

9. A radio frequency identification method comprising:

storing an identification code and a set of verifiable data in a radio frequency identification tag; and a radio frequency identification reader sending a reading request to the radio frequency identification tag, requesting to read a first portion of the set of verifiable data, wherein the radio frequency identification tag, upon receiving the reading request from the radio frequency identification reader, if a locking operation has not been performed on a second portion of the set of verifiable data, then the radio frequency identification tag performs the locking operation on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein $k = n*0.5$ if n is even; and $k = n*0.5 + 0.5$ or $k = n*0.5 - 0.5$ if n is odd.

10. A radio frequency identification method comprising:

storing an identification code and a set of verifiable data in a radio frequency identification tag; and a radio frequency identification reader sending a reading request to the radio frequency identification tag, requesting to read a first portion of the set of verifiable data, wherein the radio frequency identification tag, upon receiving the reading request from the radio frequency identification reader, if a locking operation has not been performed on a second portion of the set of verifiable data, then the radio frequency identification tag performs the locking operation on the second portion of the set of verifiable data, so that, from then on, any data of the second portion of the set of verifiable data cannot be read, wherein the set of verifiable data includes n digital signatures $SIG_1, SIG_2, \ldots, SIG_n$, the first portion of the set of verifiable data includes k digital signatures of the n digital signatures, and the second portion of the set of verifiable data includes q digital signatures of the n digital signatures, and wherein each digital signature $SIG_i$ of the n digital signatures $SIG_1, SIG_2, \ldots, SIG_n$ takes a form of $(S_i, C)$, including a portion $S_i$ and a portion C, i=1, ..., n, and all digital signatures of the n digital signatures share one common portion C.

11. The radio frequency identification method according to claim 10, further comprising computing and verifying each digital signature of the n digital signatures as follows:

selecting a group G of order v;

selecting a subgroup of order u of said group G, where $u \leq v$;

selecting n private keys x1, x2, ..., xn based on said order u, where $1 < |xi| < u$, i=1, ..., n;

selecting an element g of group G as the generator;

selecting n integers r1, r2, ..., rn as indicators within said order u, where $0 < |ri| < u$, i=1, ..., n;

selecting a random integer r within said order u, where $0 < |r| < u$, and computing $C = H(M, g^{r*r1*r2* \cdots *rn})$ where H is secure hashing function, and M represents the identification code and other information;

computing $S_i = r*(r1*r2* \cdots *rn)/ri - C*xi$;

releasing $(S_1, C), (S_2, C), \ldots, (S_n, C)$ as n digital signatures on the same message M;

computing public keys $y_i (g^{ri}, g^{ri*xi})$ based on said private key, said generator and said indicator;

based on public-key $y_i$, verifying whether $SIG_i = (S_i, C)$ is valid signature on the message M by computing $C' = H(M, (g^{ri})^{si} * (g^{ri*xi})^C)$, and If $C' = C$, $SIG_i$ is a valid digital signature on message M; otherwise, $SIG_i$ is invalid.

12. The radio frequency identification method according to claim 10, further comprising computing and verifying each digital signature of the n digital signatures as follows:

selecting a group G of order v;

selecting a subgroup of order u of said group G, where $u \leq v$;

selecting n private keys x1, x2, ..., xn based on said order u, where $1 < |xi| < u$, $i = 1, ..., n$;

selecting an element g of group G as the generator;

selecting n integers r1, r2, ..., rn as indicators within said order u, where $0 < |ri| < u$, $i = 1, ..., n$;

selecting a random integer r within said order u, where $0 < |r| < u$, and computing $C = H(M, g^{r*r1*r2* \cdots *rn})$ where H is secure hashing function, and M represents the identification code and other information;

computing $S_i = r*(r1*r2* \ldots *rn)/(r1*r2* \ldots *ri) - C*xi$;

releasing $(S_1, C), (S_2, C), \ldots, (S_n, C)$ as n digital signatures on the same message M;

computing public keys $y_i = (g^{r1*r2* \cdots *ri}, g^{r1*r2* \cdots *ri*xi})$ based on said private key, said generator and said indicator;

based on public-key $y_i$, verifying whether $SIG_i = (S_i, C)$ is valid signature on the message M by computing $C' = H(M, (g^{r1*r2* \cdots *ri})^{si} * (g^{r1*r2* \cdots *ri*xi})^C)$, and If $C' = C$, $SIG_i$ is a valid digital signature on message M; otherwise, $SIG_i$ is invalid.

* * * * *

UNITED STATES PATENT AND TRADEMARK OFFICE
CERTIFICATE OF CORRECTION

PATENT NO.        : 8,058,973 B2                          Page 1 of 1
APPLICATION NO.   : 11/519130
DATED             : November 15, 2011
INVENTOR(S)       : Ke Zeng, Tomoyuki Fujita and Min-Yu Hsueh It is certified that error appears in the above-identified patent and that said Letters Patent is hereby corrected as shown below:

In the Drawings

Drawing Sheet 7/21, Box 704: Delete "$SIG_{21}\ SIG_{22}\ ...\ SIG_{2,n}$" and insert -- $SIG_{2,1}\ SIG_{2,2}\ ...\ SIG_{2,n}$ --
Drawing Sheet 10/21, Box 1012: Delete "i++" and insert -- i+1 --
Drawing Sheet 15/21, Box 1508: Delete "i++" and insert -- i+1 --
Drawing Sheet 15/21, Box 1514: Delete "i++" and insert -- i+1 --
Drawing Sheet 17/21, Box 1704: Delete "$SIG_{21}\ SIG_{22}\ ...\ SIG_{2,n}$" and insert -- $SIG_{2,1}\ SIG_{2,2}\ ...\ SIG_{2,n}$ --
Drawing Sheet 20/21, Box 2009: Delete "i++" and insert -- i+1 --
Drawing Sheet 20/21, Box 2016: Delete "i++" and insert -- i+1 --
Drawing Sheet 20/21, Box 2018: Delete "j++" and insert -- j+1 --

In the Specification

Column 11, Line 34: Delete "$_{\{SIGi,1,}$" and insert -- $\{SIG_{i,1}$, --
Column 11, Line 45: Delete "$\{SIG_{i,n\_1}$," and insert -- $\{SIG_{i,a\_1}$, --
Column 19, Line 55: Delete "$(g^{r1*r2\ ...\ ri*xi})^C)$" and insert -- $(g^{r1*r2\ ...\ *ri*xi})^C)$ --
Column 19, Line 67: Delete "a◊a-1=a-◊a=e." and insert -- a◊a-1=a-1◊a=e. --

In the Claims

Column 23, Line 48: In Claim 8, delete "$y_i(g^{r1*r2*}$" and insert -- $y_i=(g^{r1*r2*}$ --
Column 24, Line 59: In Claim 11, delete "$y_i(g^{ri}$," and insert -- $y_i=(g^{ri}$, --

Signed and Sealed this
Seventh Day of October, 2014

Michelle K. Lee
*Deputy Director of the United States Patent and Trademark Office*